United States Patent
Liu et al.

(10) Patent No.: US 12,081,023 B2
(45) Date of Patent: Sep. 3, 2024

(54) CONTROL METHODS AND APPARATUS FOR PARALLEL OPERATION OF MULTIPLE PORTABLE POWER STATIONS

(71) Applicant: Queen's University at Kingston, Kingston (CA)

(72) Inventors: Yan-Fei Liu, Kingston (CA); Binghui He, Kingston (CA); Yang Chen, Hefei (CN); Bo Sheng, Kingston (CA)

(73) Assignee: Queen's University at Kingston, Kingston (CA)

( * ) Notice: Subject to any disclaimer, the term of this patent is extended or adjusted under 35 U.S.C. 154(b) by 100 days.

(21) Appl. No.: 18/079,104

(22) Filed: Dec. 12, 2022

(65) Prior Publication Data

US 2023/0420939 A1 Dec. 28, 2023

Related U.S. Application Data

(60) Provisional application No. 63/388,062, filed on Jul. 11, 2022, provisional application No. 63/355,073, filed on Jun. 23, 2022.

(51) Int. Cl.
*H02J 3/00* (2006.01)
*H02J 7/02* (2016.01)
*H02J 7/34* (2006.01)
*H02J 13/00* (2006.01)
*H02M 7/797* (2006.01)

(52) U.S. Cl.
CPC ............... *H02J 3/007* (2020.01); *H02J 7/02* (2013.01); *H02J 7/342* (2020.01); *H02J 13/00022* (2020.01); *H02M 7/797* (2013.01); *H02J 2207/20* (2020.01)

(58) Field of Classification Search
CPC .... H02J 3/007; H02J 7/02; H02J 7/342; H02J 13/00022; H02J 2207/20
See application file for complete search history.

(56) References Cited

U.S. PATENT DOCUMENTS

| | | | |
|---|---|---|---|
| 2015/0069957 A1* | 3/2015 | Chang | H02J 7/007 320/107 |
| 2016/0197504 A1* | 7/2016 | Hsia | H02J 7/342 307/66 |

* cited by examiner

*Primary Examiner* — Jeffrey M Shin
(74) *Attorney, Agent, or Firm* — Stephen J. Scribner

(57) ABSTRACT

A portable power station (PPS) unit includes a controller that receives AC current information of AC input current at an AC input port and produces a control signal that is used to control the PPS unit to operate as a voltage source or a current source, and to control an AC output current at substantially the same magnitude, frequency, and phase as the AC input current. A PPS apparatus includes two or more PPS units connected together such that the AC output power of one PPS unit is connected to the AC input port of a next PPS unit; wherein a first PPS unit is a voltage source and each of the second or more PPS units is a current source, and a total AC output power of the PPS apparatus is substantially a sum of the AC output power produced by the two or more PPS units.

23 Claims, 19 Drawing Sheets

CONTROL METHODS AND APPARATUS FOR PARALLEL OPERATION OF MULTIPLE PORTABLE POWER STATIONS

RELATED APPLICATION

This application claims the benefit of the filing date of Application No. 63/355,073, filed on Jun. 23, 2022, and Application No. 63/388,062, filed on Jul. 11, 2022, the contents of which are incorporated herein by reference in their entirety.

FIELD

The invention is in the field of portable power stations. More specifically, the invention provides portable power stations that may be connected together in parallel to provide greater output power, and related control methods.

BACKGROUND

A Portable Power Station (PPS) uses a battery as a power source. It converts the battery DC voltage into an AC voltage (e.g., 220 VAC, 50 Hz in Europe, China; 120 VAC, 60 Hz in North America). Depending on the power rating and energy storage requirement, the battery voltage is typically between 20V to 40V. In order to reduce the cost and to reduce the battery re-charging time, a bi-directional inverter is used.

During battery discharging operation, the bi-directional inverter operates in inverter mode to convert the battery DC voltage (such as 20V) into AC voltage, such as 120 VAC. During battery re-charging operation, the PPS is connected to an external AC power source and the external AC voltage charges the battery. In this case, the bi-directional inverter operates in rectifier mode.

FIG. 1 shows typical face plate connections of a PPS with bi-directional inverter. In this figure the PPS has three inverter outlets so that three AC loads can be connected to the PPS at the same time. As shown at the right side, an AC input connector is provided so that an external AC voltage (e.g., from the grid, such as 120V in North America, or 220V in Europe, China) can be applied to the PPS and the battery can be re-charged through the bi-directional inverter, which then operates in rectifier mode.

For safe operation, different terminals are used for the inverter output terminal (as shown at the left side in FIG. 1) and for the AC input terminal. FIG. 2 is a block diagram of a typical bi-directional inverter. Lout and Nout are the output terminals of the inverter. AC voltage produced by the inverter is output at these two terminals. Lin and Nin are the AC input terminals. The AC voltage is applied to these two terminals to re-charge the battery.

FIG. 3 shows one possible circuit diagram for the bi-directional inverter. It shows in more detail the connection between the inverter output terminals and AC input terminals. During battery discharging (or inverter) operation mode, the battery voltage is increased to a bus voltage Vbus by a bi-directional DC to DC converter. The bus voltage is typically around 360V to 400V. A non-isolated DC to AC inverter converts the Vbus to an AC voltage, such as 220 VAC. The AC voltage is provided to the load by terminals Lout and Nout.

During battery re-charging (rectifier) mode, external AC voltage is applied to terminals Lin and Nin. An EMI filter, consisting of C1, L1, and C2, may optionally be used to reduce noise injected into the AC grid. If the output filter of the bi-directional inverter is large enough, the EMI filter can be omitted.

SUMMARY

One aspect of the invention relates to a portable power station (PPS) unit, comprising: an AC input port adapted to receive AC power; a connection point for an energy storage device that stores electrical energy as DC power; an AC output port adapted to output AC power; an inverter that converts DC power from the energy storage device to AC power that is output by the AC output port; a controller that receives AC current information of AC power that is received at the AC input port and produces a control signal for the inverter; wherein the controller controls the PPS unit to operate as a voltage source or a current source based on the control signal.

In one embodiment the energy storage device comprises at least one battery.

In one embodiment the energy storage device comprises at least one battery that is housed in the PPS unit.

In one embodiment the inverter comprises a bi-directional inverter; wherein the bi-directional inverter operates in a rectifier mode that converts AC power received at the AC input port to DC power to charge the energy storage device, and in an inverter mode that converts DC power from the energy storage device to AC power that is output by the AC output port.

In one embodiment the controller receives AC current information of a first AC input power that is received at the AC input port and produces a control signal from the AC current information; wherein the control signal controls the inverter to operate as a current source and to produce an AC output power having a current at substantially the same frequency and phase as the first AC input power; wherein a total AC output power of the PPS unit is substantially a sum of the AC input power received at the AC input port and the AC output power produced by the PPS unit.

In one embodiment the first AC input power is produced by a first PPS unit operating as a voltage source.

In one embodiment the controller implements at least one of a PPS unit startup strategy and a PPS unit shut down strategy.

In one embodiment the controller implements a PPS unit soft startup strategy.

In one embodiment the controller is configured for wireless communications with a remote device.

Another aspect of the invention relates to a PPS apparatus comprising: two or more PPS units connected together one after another such that the AC output power of one PPS unit is connected to the AC input port of a next PPS unit; wherein a first PPS unit comprises a voltage source; wherein a second or more PPS units as described herein operate as a current source; wherein a total AC output power of the PPS apparatus is substantially a sum of the AC output power produced by the two or more PPS units.

In one embodiment the first PPS unit comprises a PPS unit as described herein operating as a voltage source.

In one embodiment, for each PPS unit j, wherein j=2, 3, 4, . . . , N, an AC output current is approximately equal to the AC output current of the previous PPS unit*1/(j−1).

In one embodiment the controller of the second or more PPS unit implements instantaneous current control; wherein an instantaneous value of an output current of the second or more PPS unit is controlled to be the same as an instantaneous value of an output current of a previous PPS unit.

In one embodiment the controller of the second or more PPS unit implements delayed current control; wherein an output current of the second or more PPS unit at one line period is controlled to be the same as the output current of a previous PPS unit at a previous line current period.

In one embodiment the controller of the second or more PPS unit implements delayed current control; wherein an rms value of the output current of the second or more PPS at a next line current period unit is controlled to be the same as a value of the output current of a previous PPS unit at a previous line current period.

In one embodiment the value of the output current of a previous PPS unit at a previous line current period is an rms value.

In one embodiment the value of the output current of a previous PPS unit at a previous line current period is an average of the absolute value of the output current of the previous PPS unit during a previous line current cycle.

Another aspect of the invention relates to a method for implementing a portable power station (PPS) unit, comprising: providing an AC input port adapted to receive AC power, a connection point for an energy storage device that stores electrical energy as DC power, an AC output port adapted to output AC power; and an inverter that converts DC power from the energy storage device to AC power that is output by the AC output port; using a controller to receive AC current information of AC power that is received at the AC input port and produce a control signal for the inverter; using the controller to control the PPS unit to operate as a voltage source or a current source based on the control signal.

In one embodiment the controller receives AC current information of a first AC input power that is received at the AC input port and produces the control signal from the AC current information; wherein the control signal controls the inverter to operate as a current source and to produce an AC output power having a current at substantially the same frequency and phase as the first AC input power; wherein a total AC output power of the PPS unit is substantially a sum of the AC input power received at the AC input port and the AC output power produced by the PPS unit.

In one embodiment the first AC input power is produced by a first PPS unit operating as a voltage source.

Another aspect of the invention relates to a method for implementing a PPS apparatus comprising: connecting two or more PPS units together one after another such that the AC output power of one PPS unit is connected to the AC input port of a next PPS unit; wherein a first PPS unit comprises a voltage source; wherein a second or more PPS units as described herein operate as a current source; wherein a total AC output power of the PPS apparatus is substantially a sum of the AC output power produced by the two or more PPS units.

In one embodiment, for each PPS unit j, wherein j=2, 3, 4, . . . , N, an AC output current is approximately equal to the AC output current of the previous PPS unit*1/(j−1).

One embodiment comprises controlling the second or more PPS unit using instantaneous current control; wherein an instantaneous value of an output current of the second or more PPS unit is controlled to be the same as an instantaneous value of an output current of a previous PPS unit.

One embodiment comprises controlling the second or more PPS unit using delayed current control; wherein an output current of the second or more PPS unit at one line period is controlled to be the same as the output current of a previous PPS unit at a previous line current period.

One embodiment comprises controlling the second or more PPS unit using delayed current control; wherein an rms value of the output current of the second or more PPS at a next line current period unit is controlled to be the same as a value of the output current of a previous PPS unit at a previous line current period.

In one embodiment the value of the output current of a previous PPS unit at a previous line current period is an rms value.

In one embodiment the value of the output current of a previous PPS unit at a previous line current period is an average of the absolute value of the output current of the previous PPS unit during a previous line current cycle.

In one embodiment each of the two or more PPS units communicates with an APP running on a remote device; wherein one or more parameters of each of the two or more PPS units is controlled by the APP.

Another aspect of the invention relates to non-transitory computer readable media for use with a processor, the computer readable media having stored thereon instructions that direct the processor to execute processing steps that control one or more parameters of each of two or more portable power station (PPS) units connected together; wherein the two or more PPS units are connected together one after another such that the AC output power of one PPS unit is connected to the AC input port of a next PPS unit; wherein a first PPS unit operates a voltage source; wherein a second or more PPS unit operates as a current source; wherein a total AC output power of the two or more PPS units is substantially a sum of the AC output power produced by the two or more PPS units.

In one embodiment the stored instructions comprise implementing an APP on a device that communicates with at least one of the two or more PPS units.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Figure 1:
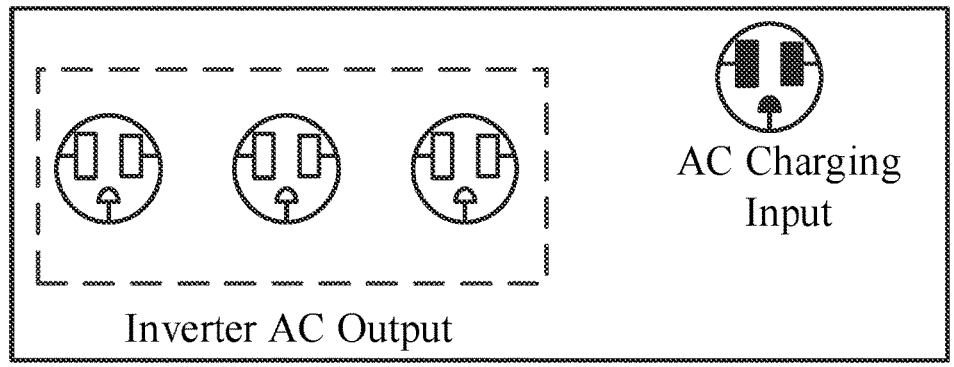
FIG. 1 is a diagram showing face plate connections of a typical portable power station (PPS) with bi-directional inverter for fast AC charging, according to the prior art.
Figure 2:
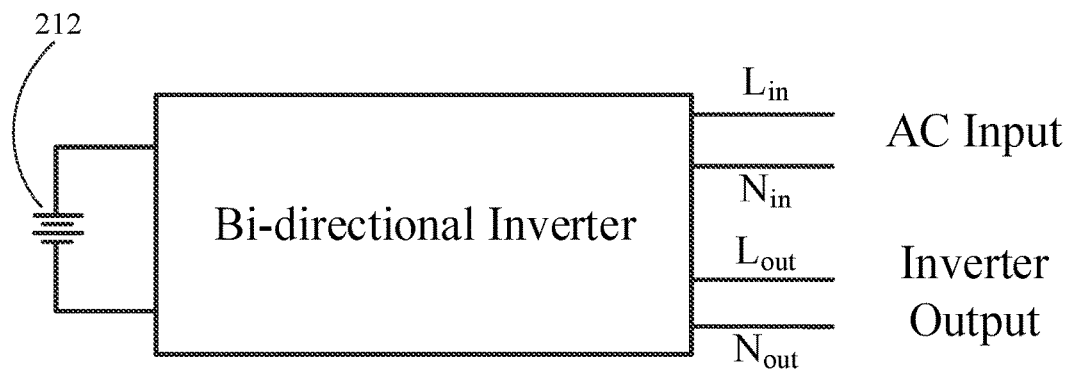
FIG. 2 is a block diagram of a bi-directional inverter, according to the prior art.
Figure 3:
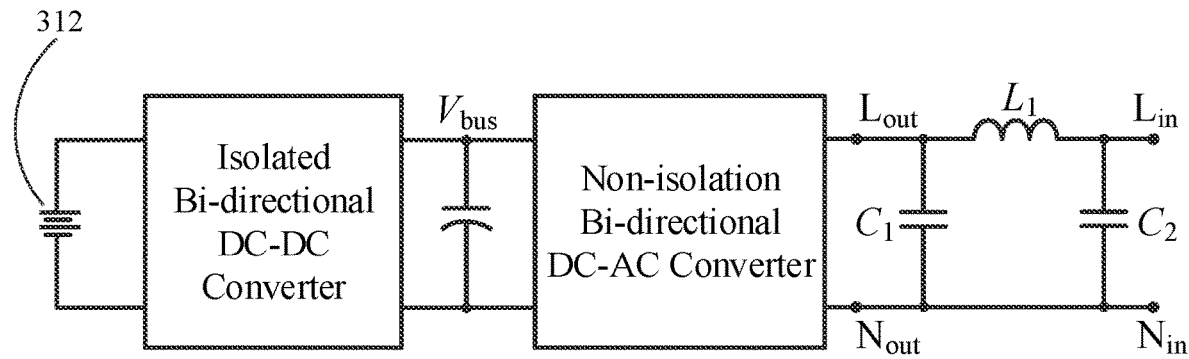
FIG. 3 is a circuit diagram of a bi-directional inverter, according to the prior art.

Since the output power of one PPS is limited, such as, e.g., 600 W, 1,200 W, etc., it would be advantageous to connect two or more PPS together to produce higher output power; for example, two 600 W PPS units connected together to produce 1,200 W output power; three 600 W PPS units connected together to produce 1,800 W output power, four 600 W PPS units connected together to produce 2,400 W output power, etc. That is, connect N 600 W PPS units together to produce N×600 W output power, or connect N 1,200 W PPS units together to produce N×1,200 W output power.

In addition, it may also be desirable to connect a 600 W PPS unit and a 1,200 W PPS unit together to produce 1,800 W output power. Or in more general cases, to connect N 600 W PPS units and M 1,200 W PPS units together to produce output power of N×600 W+M×1,200 W. Or, more generally, connect N PPS units together to produce a total output power that is the sum of the output powers of each of the N PPS units.

As used herein, the terms "charge the battery" and "recharge the battery" are used interchangeably. Both refer to providing energy to the battery.

As used herein, the term "substantially" as used with respect to a value or condition refers to a value or condition that is the same as, or close to a desired or selected value or condition, as may be achieved within tolerances of circuit components, control parameters, etc. By using the term "substantially" it is understood that a recited characteristic, parameter, and/or value need not be achieved exactly, but that deviations or variations, including for example, tolerances, measurement error, measurement accuracy limitations and other factors known to those of ordinary skill in the art, may occur in amounts that do not preclude the effect the characteristic, parameter, and/or value was intended to provide. A characteristic, parameter, and/or value that is substantially absent (e.g., substantially removed, substantially zero) may be one that is within the noise, beneath background, below detection limits, or a small fraction (e.g., <1%, <0.1%, <0.01%, <0.001%, <0.00001%, <0.000001%, <0.0000001%) of the significant characteristic. It is understood that a characteristic, parameter, and/or value that is referred to herein as being the "same" as another characteristic, parameter, and/or value may be substantially the same as the other characteristic, parameter, and/or value.

As used herein, the terms "inverter" and "unit" are used interchangeably. For example, inverter 2 means the inverter of unit 2 and the output of unit 2 means the output of inverter 2.

As used herein, unless otherwise specified, the symbols I and I(t) and the symbols V and V(t) are used interchangeably, and they refer to the current and voltage, respectively. For example, I1 and I1(t) both refer to the output current of inverter 1, and Vout1 and Vout1(t) both refer to the output voltage of inverter 1.

In embodiments described herein, an EMI filter may be included for illustration. However, the technology described herein may also be implemented when an EMI filter is not included.

In embodiments described herein, for ease of illustration, the input and output ports (also referred to herein as terminals) are shown on one face plate of a PPS. In actual implementations, various other layouts may be used wherein the ports may be positioned on different sides of the PPS.

Described herein are methods and circuits that allow two or more PPS units to be connected in parallel to produce more output power to the load. An embodiment based on two PPS units (unit 1 and unit 2) may include the following features:

1. The inverter output of unit 1 may be connected to the AC input terminals of unit 2.
2. The load is connected to the inverter output terminals of unit 2.
3. Unit 2 senses the AC voltage at the input terminals of unit 2.
4. Unit 2 senses the AC current provided by unit 1.
5. Unit 2 generates an AC current that is the same amplitude, phase, and frequency as the current provided by unit 1.
6. The current from unit 1 and the current produced by unit 2 are added together in unit 2 and flow to the load.

Figure 4A:
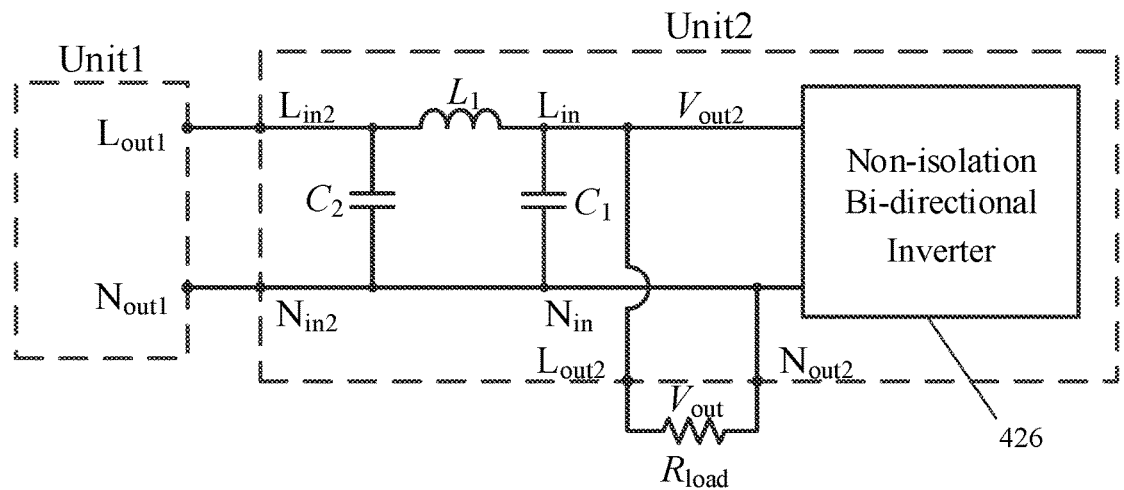
FIG. 4A is a circuit diagram showing two PPS units connected in parallel, according to one embodiment.
Figure 4B:
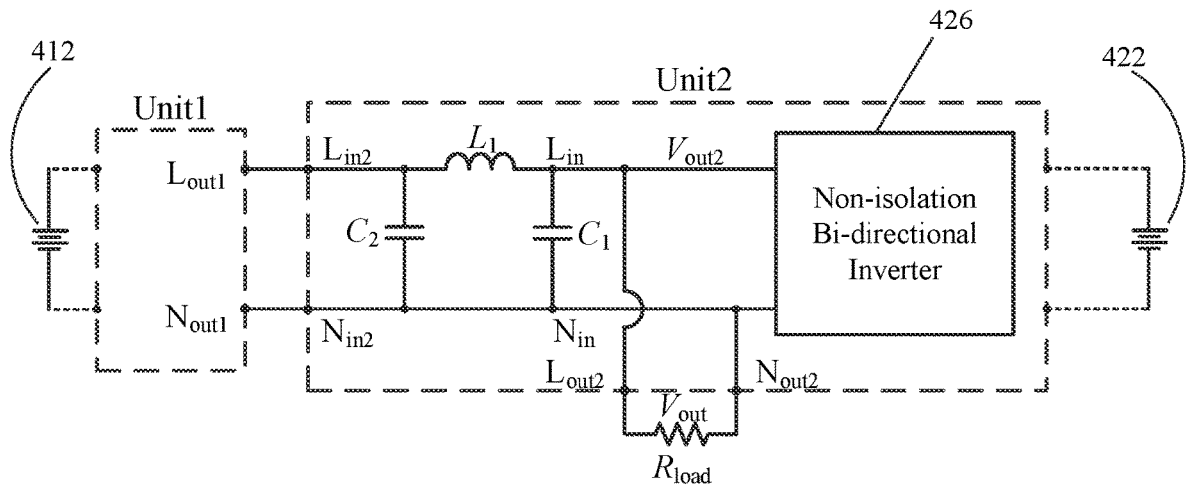
FIG. 4B is a circuit diagram showing two PPS units connected in parallel, according to one embodiment.
Figure 4C:
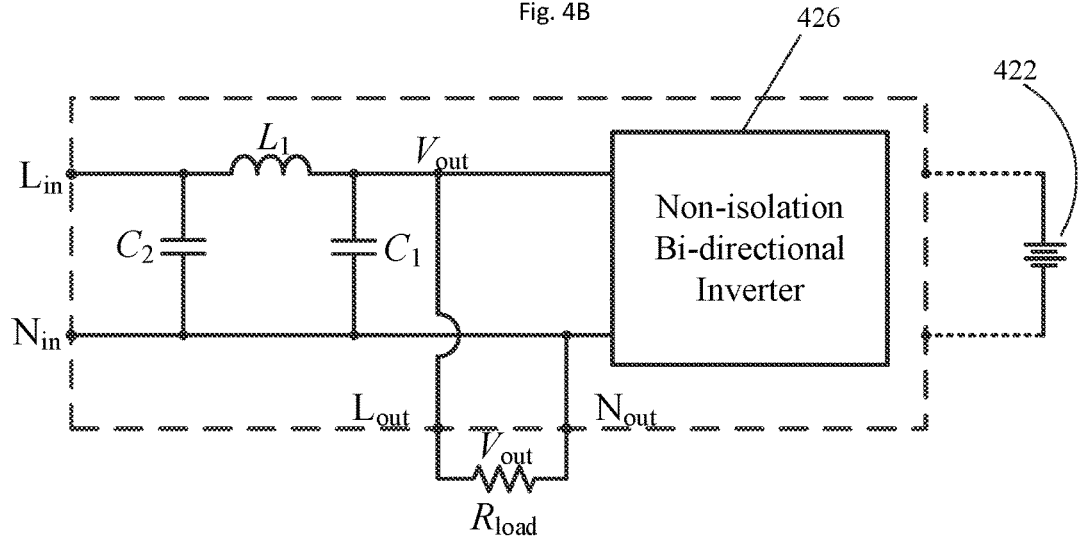
FIG. 4C is a circuit diagram of a PPS unit, according to one embodiment.

FIGS. 4A and 4B show connection block diagrams of embodiments incorporating these features. FIG. 4C is a diagram of an embodiment not connected to another PPS unit at its input terminals Lin and Nin. The embodiments of FIGS. 4A, 4B, and 4C include a non-isolated bi-directional inverter 426. Referring to FIGS. 4A and 4B, the inverter output terminals of unit 1, Lout1 and Nout1, are connected to the AC input terminals of unit 2, Lin2 and Nin2. In unit 2, it is noted that AC input terminals Lin2, Nin2 are connected to the output terminals of the bi-directional inverter 426, Vout2, at terminals Lout2 and Nout2 through an optional EMI filter (C1, L1, C2). As shown in FIG. 4B, each PPS unit uses an energy storage device, such as a battery 412, 422, that stores DC power. The battery may be housed internally in a PPS, or it may be external to the PPS, or there may be both internal and external batteries. An external battery may advantageously allow a large battery or an array of batteries to be used, and allow for easy replacement of a discharged battery with a charged battery. Accordingly, as shown in FIGS. 4B and 4C, embodiments may include connection points (e.g., on a front or back panel of a PPS) to allow for connection to an external battery. For example, an external battery may be connected to a DC input port such as that shown in the embodiment of FIG. 56.

As used herein, the term "inverter" may refer to a non-isolated bidirectional inverter, or DC-DC converter, or AC to DC rectifier since the power can flow from both directions. The non-isolated bidirectional inverter may be implemented with, e.g., a full bridge inverter, a half bridge inverter, or other topologies. The choice of inverter topology used will depend on the PPS design, as would be apparent to one of ordinary skill in the art.

The load of the combined two units is connected to the inverter output terminals of unit 2, Lout2 and Nout2, as shown in the embodiments of FIGS. 4A and 4B. With this connection, both the output current of unit 1 and the output current of unit 2 will flow into the load resistor RLoad. Therefore, the load resistor RLoad can take the output power of unit 1 and unit 2. If the output power of unit 1 and unit 2 are both 600 W, the load power is 1,200 W. If the output power of unit 1 is 600 W, output power of unit 2 is 1,200 W, then the load power is 1,800 W (600+1,200).

It is noted that in the above discussion, it is assumed that a bi-directional inverter is used, and AC input terminals are provided. During normal operation (i.e., operation of a single PPS unit), the AC input terminals are used to receive the AC voltage which is converted to a DC voltage to charge the battery.

Figure 5A:
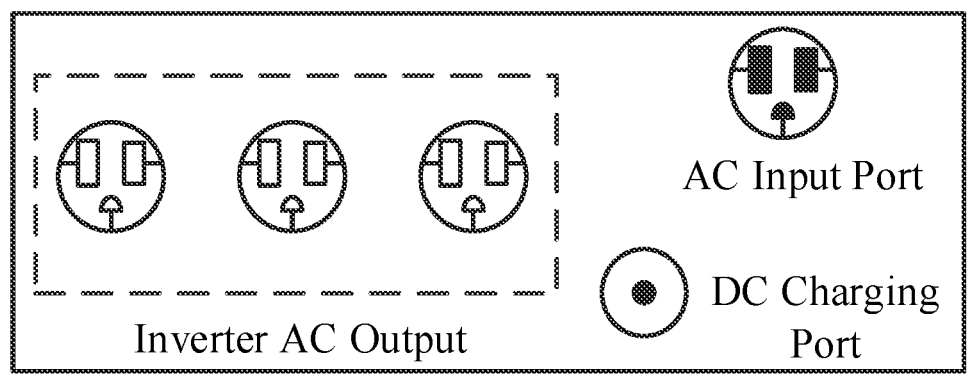
FIG. 5A is a diagram showing face plate connections of a PPS unit with a one-directional inverter for parallel operation, according to one embodiment.

In some embodiments, a one-directional DC to AC inverter is used. With a one-directional DC to AC inverter, the power flows in one direction, from DC to AC. Another DC power supply is needed to charge the battery through a DC charging port, as shown in the embodiment of FIG. 5A. In this embodiment, in order to achieve parallel operation, a parallel AC input port may be added (and mounted to the face plate of the PPS) so that the inverter output of another PPS unit may be connected to the parallel AC input port.

Figure 5B:
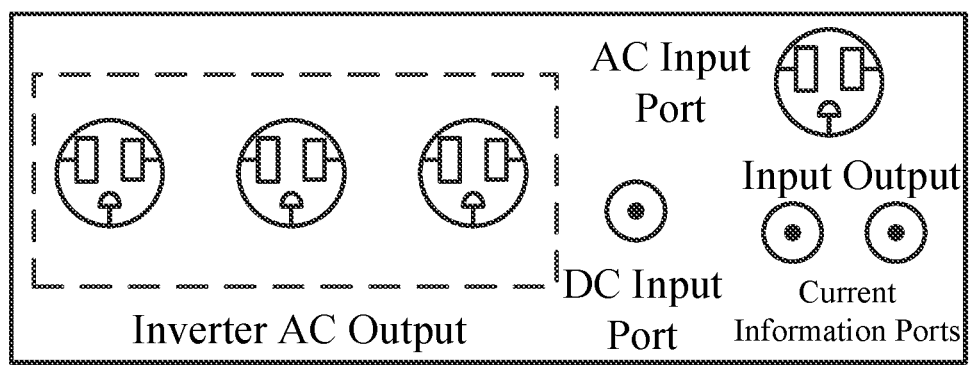
FIG. 5B is a diagram showing face plate connections of a PPS unit with input and output current information ports, according to one embodiment.
Figure 5C:
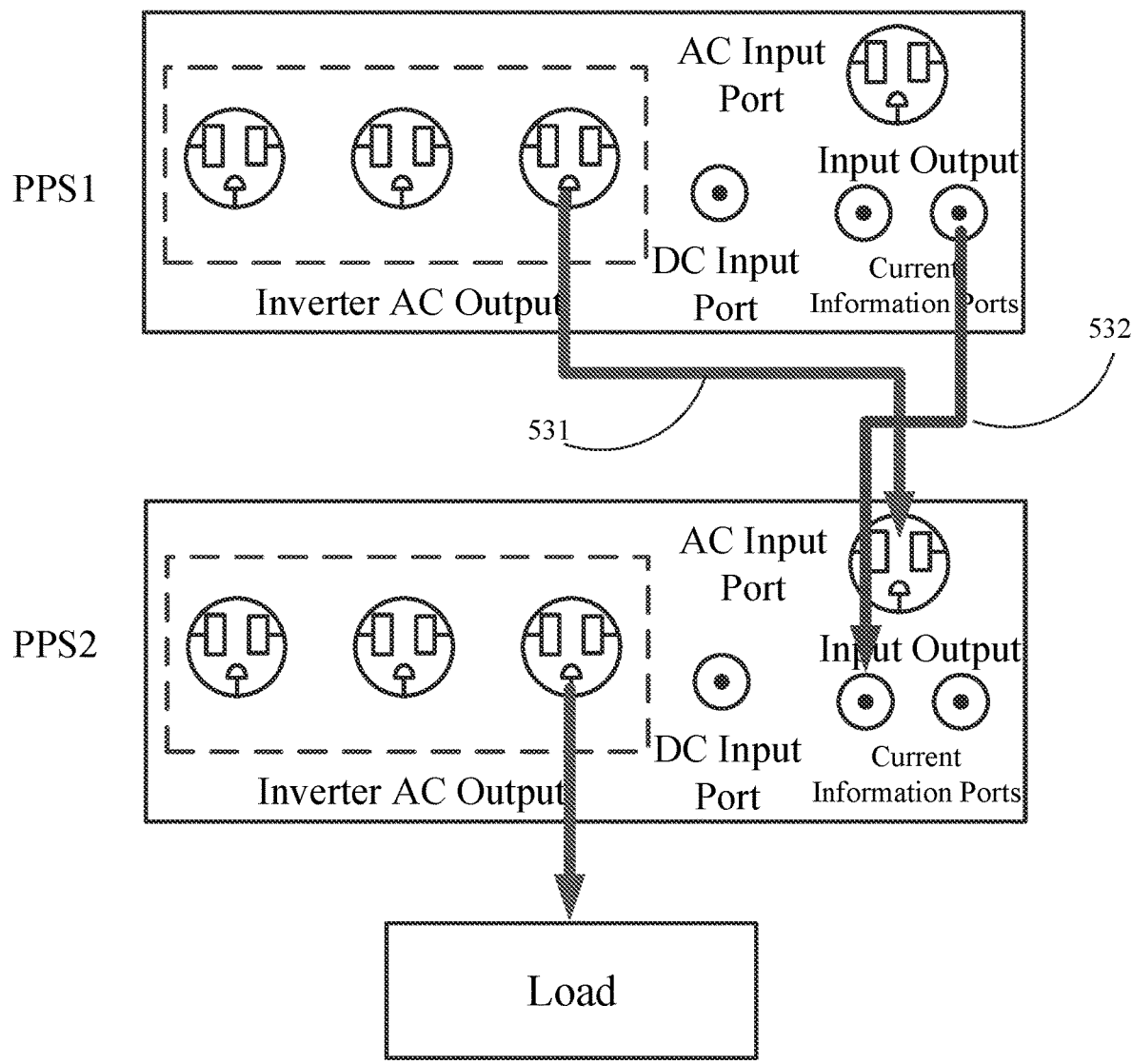
FIG. 5C is a diagram showing face plate connections of two PPS units with input and output current information ports connected together for parallel operation, according to one embodiment.

In some embodiments, information about the AC input current provided to each of a second, third, fourth, etc. PPS unit may be provided via a separate cable(s) connected between the PPS unit(s). For example, the embodiment of FIG. 5B includes current information input and output ports to allow a current information cable to be connected between PPS units. FIG. 5C shows connection of two PPS units according to FIG. 5B, wherein the current information output port of PPS unit 1 is connect to the current information input port of PPS unit 2 using a current information cable 532. This cable is in addition to the power cable 531 that connects the AC output port of PPS unit 1 to the AC input port of PPS unit 2.

Figure 6:
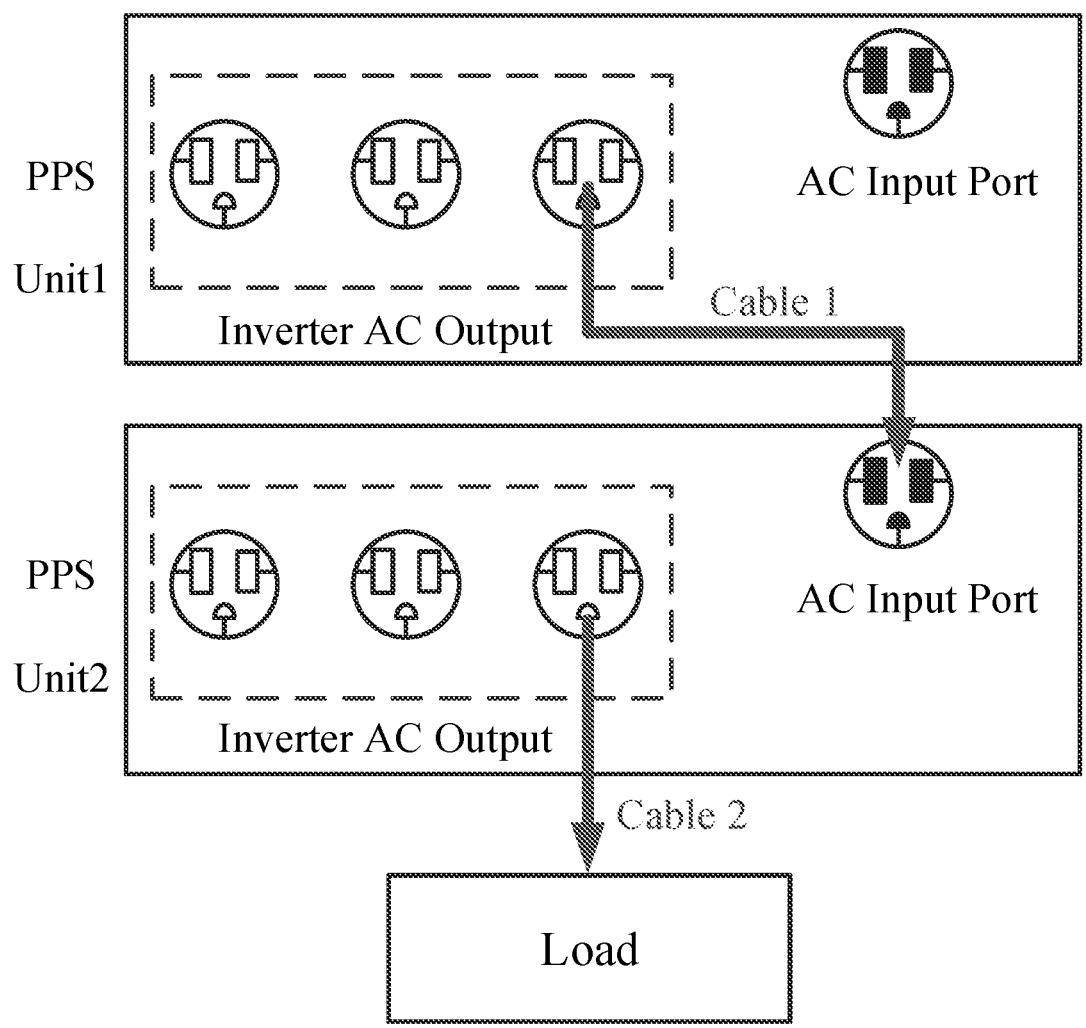
FIG. 6 is a diagram showing two PPS units in parallel operation, according to one embodiment.
Figure 7:
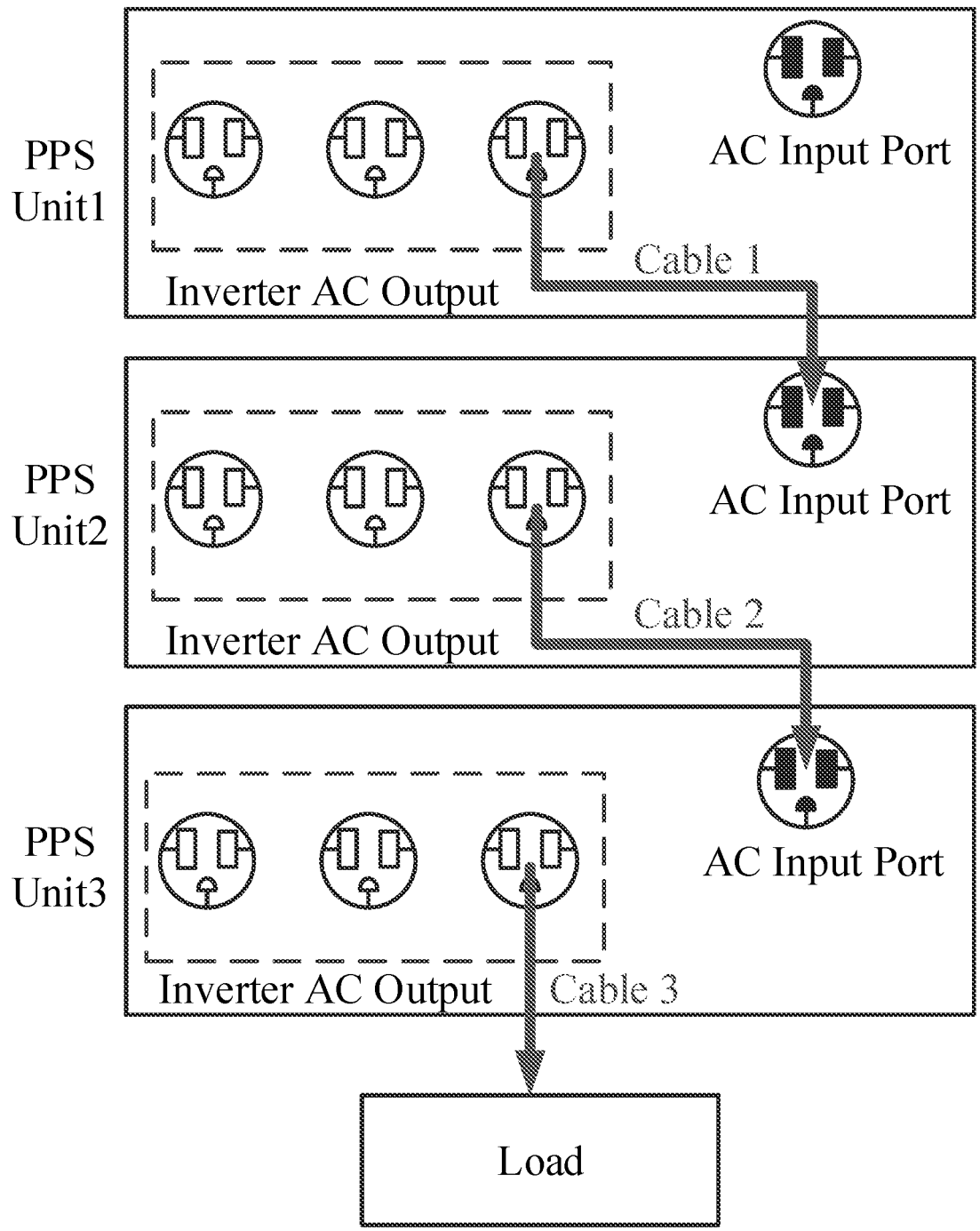
FIG. 7 is a diagram showing three PPS units in parallel operation, according to one embodiment.
Figure 8:
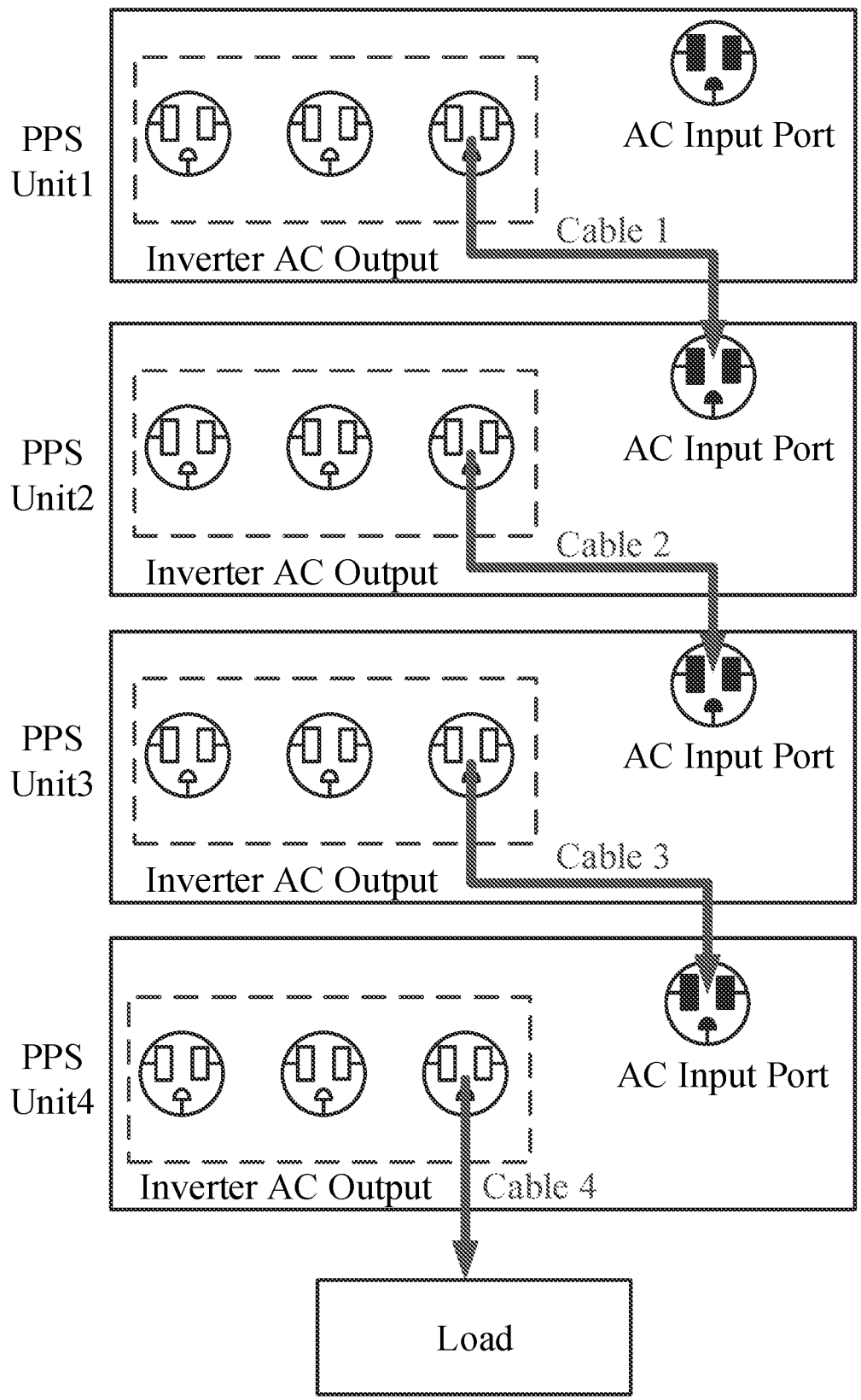
FIG. 8 is a diagram showing four PPS units in parallel operation, according to one embodiment.
Figure 9:
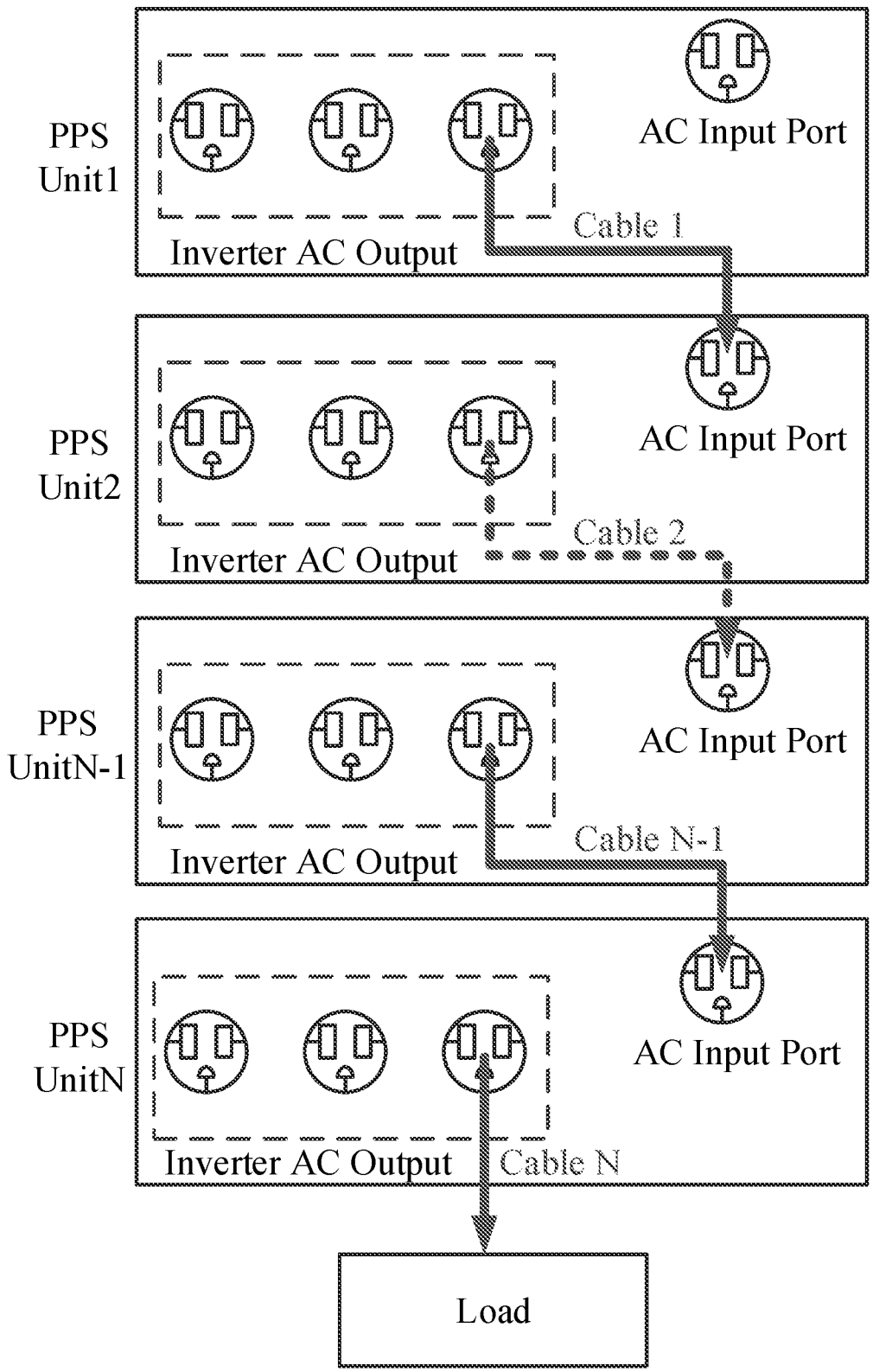
FIG. 9 is a diagram showing N PPS units in parallel operation, according to one embodiment.

However, according to other embodiments, a PPS unit senses the AC current provided to its AC input port, so that an additional current information cable is not required. FIG. 6 shows two PPS units connected for parallel operation, according to one embodiment. The inverter output of PPS unit 1 is connected by an AC cable 1 to the AC input port of PPS unit 2. PPS unit 2 senses the AC current provided by PPS unit 1 to produce a current reference signal for PPS unit 2, which is achieved by connecting the AC output of PPS unit 1 to the AC input port of PPS unit 2; that is, only the power cable (i.e., Cable 1 in FIG. 6) connecting the two PPS units is required to achieve these functions. This applies to any number of PPS units connected together, for example, 3, 4, or N units connected together as shown in the embodiments of FIGS. 7, 8, and 9, respectively.

Referring to FIG. 6, as an example, the total output power at the output port of unit 2 will be substantially the sum of the output power of unit 1 and unit 2. For example, if unit 1 can produce 600 W power and unit 2 can produce 600 W power, then through the connection shown in FIG. 6, the two PPS units will be able to produce 1,200 W power to the load that is connected by cable 2.

It is noted that in FIG. 6, the AC input port can function as the AC charging input port when a bi-directional inverter is used. The AC input port can also function as an added parallel AC input port when a one-directional inverter is used, as shown in FIG. 5.

It is also noted that for a bi-directional inverter implementation, an additional AC input port may be used for parallel operation.

In embodiments described herein, the AC input port is used to illustrate the connection and control of parallel operation of multiple PPS units to combine their output power to produce higher output power.

In embodiments described herein, the terms "connected together", "connected in parallel", and "parallel connection" are used interchangeably and mean that two or more PPS units are connected together to provide higher output power than each individual unit.

FIG. 7 shows a parallel connection of three PPS units. As an example, the maximum output power of each PPS unit may be 600 W. The inverter AC output of unit 1 is connected to the AC input port of unit 2, and the AC output power at the AC output port of unit 2 will be a maximum of 1,200 W. The inverter AC output of unit 2 is connected to the AC input port of unit 3. Then, the AC output power at the AC output port of unit 3 will be a maximum of 1,800 W.

FIG. 8 shows the parallel connection of four PPS units. As an example, it is assumed that the maximum output power of each PPS unit is 600 W. The inverter output of unit 1 is connected to the AC Input Port of unit 2. The output of unit 2 will be able to produce 1,200 W. The inverter output of unit 2 is connected to the AC Input Port of unit 3. Then, the output of unit 3 will be able to produce 1,800 W. The inverter output of unit 3 is connected to the AC Input Port of unit 4. Then the output of unit 4 will be able to produce 2,400 W power.

The technology allows the above-described connection to be extended to other numbers of parallel PPS units, as shown in FIG. 9 for N PPS units. Thus, it is straight-forward to connect multiple PPS units together to achieve high power ratings when needed. This is a significant advantage of the technology.

Circuit and Control of Parallel Operation of Multiple PPS Units

Figure 10:
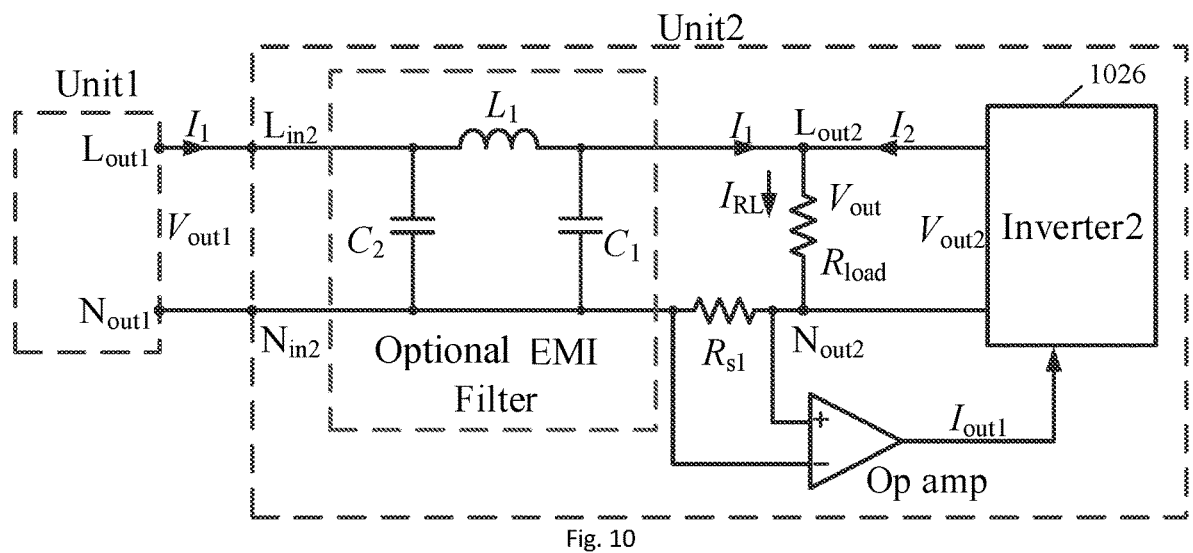
FIG. 10 is a circuit diagram of two PPS units connected in parallel, according to one embodiment.

FIG. 10 is a circuit block diagram showing parallel connection of two PPS units. The batteries of the PPS units are not shown. The inverter2 1026 of PPS unit 2 may be, for example, a non-isolated bi-directional DC-DC converter or a non-isolated bi-directional inverter. The inverter output terminals of unit 1 (Lout1, Nout1) are connected to the AC input port of unit 2 (Lin2, Nin2). Note Lin2 and Nin2 refers to AC charging input terminals when a bi-directional inverter is used and AC input port which is added when a one-directional inverter is used. The EMI filter is optional and it does not impact the parallel operation.

The inverter output terminals of unit 2 are shown as Lout2 and Nout2. The load (RLoad) of the combined output (unit 1 and unit 2) is connected to the inverter output terminals of unit 2 (Lout2, Nout2). An optional EMI filter is connected between AC input port terminals (Lint, Nin2) and inverter output terminals (Lout2, Nout2) of unit 2.

It is assumed that the output current of unit 1 is I1 and the output current of unit 2 is I2. Then, the load current IRL is:

$$IRL = I1 + I2 \quad (1)$$

It is noted that I1 and I2 are AC current as they are inverter outputs. If no special control is used, the magnitude, phase, and frequency of I1 and I2 are different.

In addition to the above connection, another feature is that the output current of unit 1, I1, is sensed by unit 2 and used as the reference for the inverter of unit 2. For example, as shown in FIG. 10, a sensing circuit including a current sensing resistor Rs1 and operational amplifier (OpAmp) may be used to sense the output current I1 and produce a reference current signal Iout1. The reference current Iout1 is used by the inverter controller of the inverter2 1026 to control the output current of the inverter2 1026. Therefore, the output current of inverter 2, I2, will be substantially the same as I1, the inverter output current of unit 1, and will have substantially the same magnitude, frequency, and phase as I1:

$$I2 = I1 \quad (2)$$

Therefore, the load current becomes:

$$IRL = I1 + I2 = 2 \times I1 \quad (3)$$

When unit 1 produces full output power I1max, unit 2 will also produce full output power I2max. Therefore, the load current will be:

$$IRL\ max = I1\ max + I2\ max = 2 \times I1\ max \quad (4)$$

Therefore, when the two PPS units have the same power rating, two times the max power can be delivered to the load RLoad since the voltages of the two inverters are the same, Vout. In the more general case, the total output power that can be delivered to the load is substantially the sum of the output powers of the two PPS units.

In FIG. 10, a resistor load is shown. In practical applications, an inductive load, and/or capacitive load may be connected, and the above connection and control technology may also be applied.

In the embodiment of FIG. 10, as in other embodiments described herein, when two or more PPS units are connected together they are referred to as having their AC outputs connected in parallel with respect to a load. As shown in FIG. 10, there may be an EMI filter and/or sensing resistor between the AC output of the first PPS unit and the AC output of the second (or more) PPS unit. Since the EMI filter and/or the sensing resistor are considered to have a negligible effect on the total AC output power of the connected PPS units, the PPS units are effectively connected in parallel, and therefore they are referred to herein as being connected in parallel.

It is noted that I2 can be controlled at half of I1, or some other relationship toll. For example, if the controller sets I2=2*I1, then PPS unit 2 will produce two times the output current and therefore, two times the output power. Similarly, if the controller sets I2=0.5*I1, then PPS unit 2 will produce half the output current and therefore, half the output power. For the purpose of this description it will be assumed that I2 is controlled to be same as I1 unless otherwise stated.

In some embodiments, Rs1 may be connected between Nin2 and Nout2 so that the output current of unit 1 can be sensed. In other embodiments current sensing may be implemented using other sensors such as a Hall effect current sensor.

Unit 1 will produce an AC voltage, Vout1, which is applied to the AC input port of unit 2, Lint, Nin2. Since the voltage drop across the EMI filter inductor L1 is normally very small, Vout can be considered the same as Vout1. With the connection described above, Vout is the inverter output of unit 2, Vout2=Vout1. Therefore, $$Vout2 = Vout1 \quad (5)$$

Figure 11:
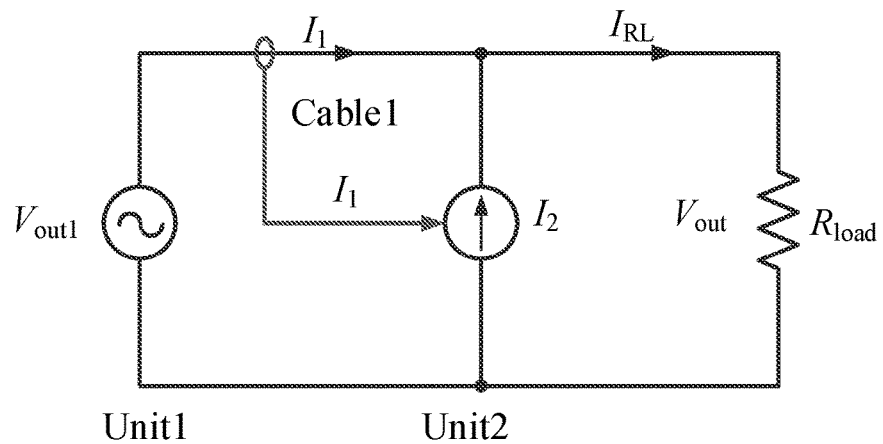
FIG. 11 is an equivalent circuit for parallel operation of two PPS units, wherein unit 1 operates as a voltage source and unit 2 operates as a current source, according to one embodiment.

Since unit 1 produces an AC voltage, it operates at voltage source mode. Since unit 2 produces an AC current I2 that is controlled to be substantially the same as the output current of unit 1, I1, it operates at AC current source mode. An equivalent circuit of the combined unit 1 and unit 2 is shown in FIG. 11.

The output of unit 1 is an AC voltage source. The output of unit 2 is an AC current source with its current I2 controlled to be the same as the output current of unit 1, I1. As shown in FIG. 11, since an AC voltage source (unit 1) is connected with an AC current source (unit 2) the system is inherently stable, and no circulating current will be generated.

Figure 12:
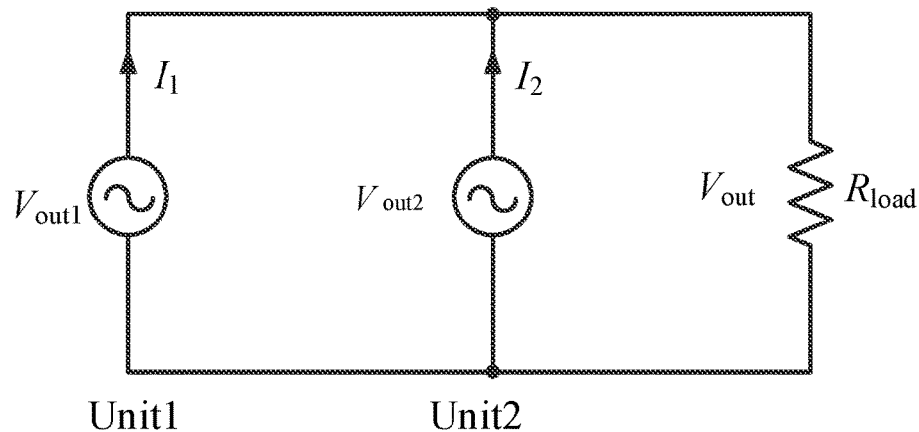
FIG. 12 is an equivalent circuit for parallel operation of two PPS units, wherein both PPS units operate as voltage sources, according to the prior art.

If two AC voltages are connected in parallel, as shown in FIG. 12, the amplitude (V), phase, and frequency (F) of the two AC voltages are the same and an additional loop is needed to make the output current of the two voltage sources the same, as shown below:

$$V1=V2,\ phase1=phase2,\ F1=F2,\ and\ I1=I2 \quad (6)$$

The control is very complex and becomes much more complex if more than two AC voltage sources are connected in parallel, which is not feasible in a practical application.

Figure 13:
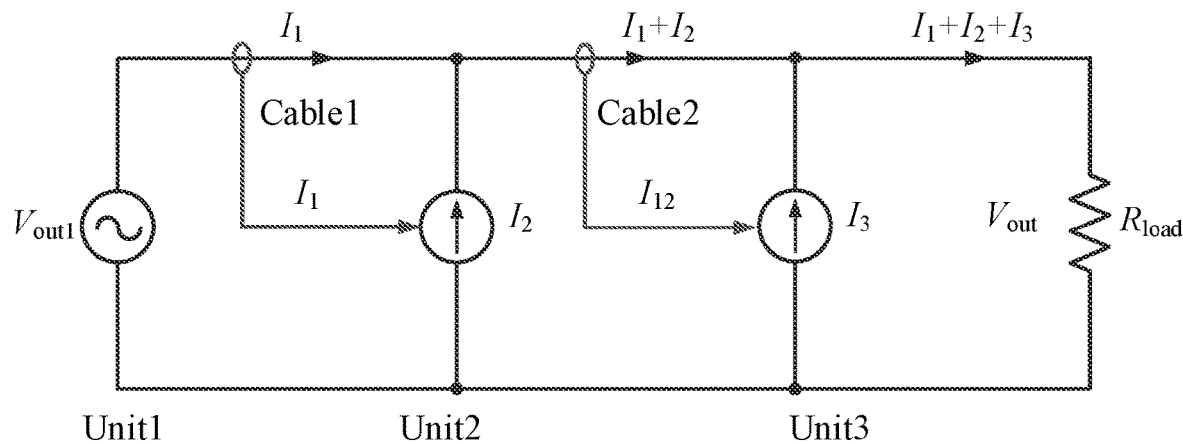
FIG. 13 is an equivalent circuit for parallel operation of three PPS units, wherein unit 1 operates as a voltage source and units 2 and 3 operate as current sources, according to one embodiment.

FIG. 13 is an electrical equivalent circuit of parallel connection of three PPS units. In this embodiment, unit 1 produces an AC voltage source, Vout1. The AC output voltage of unit 1, Vout=Vout1, is connected to the AC input port of unit 2. Unit 2 senses the output current of unit 1, I1, and produces an AC current source I2. I2 is controlled to be same as I1, I2=I1. The output of unit 1 and unit 2 provides current I12=I1+I2. The output terminals of unit 2 are connected to the AC input port of unit 3. Unit 3 senses the output current of combined unit 1 and unit 2, I12, and produces an AC current source, I3, that is half of I12.

$$I3=0.5\times I12=0.5\times(I1+I2)=I1 \quad (7)$$

Then, the load current is the sum of the output current of the three inverters:

$$IRL=I1+I2+I3=3*I1 \quad (8)$$

Therefore, when the three PPS units have the same power rating, three times the output power of a single inverter can be obtained at the load. In the more general case, the total output power that can be delivered to the load is substantially the sum of the output powers of the three PPS units.

In the discussion above, unit 1 operates as an AC voltage source and unit 2 and unit 3 operate as AC current sources. The output voltage of unit 1, Vout1, is applied to the load (neglecting the voltage drop across the EMI filter). Therefore, control of the system is much simplified. In an implementation, any one of the three units may produce an AC voltage source, and the other two units will produce an AC current source. It is only required that one unit produces an AC voltage source.

If four PPS units with the same output power rating are connected in parallel to produce four times output power of each unit, the first unit (unit 1) will produce an AC voltage source and the other three units will produce an AC current source.

Figure 14:
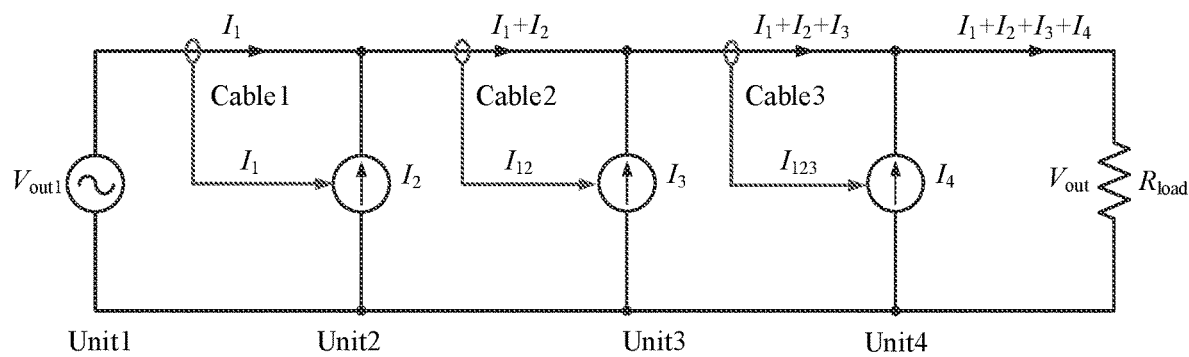
FIG. 14 is an equivalent circuit for parallel operation of four PPS units, wherein unit 1 operates as a voltage source and units 2, 3, and 4 operate as current sources, according to one embodiment.

FIG. 14 shows an electrical equivalent circuit of parallel connection of four PPS units. In this embodiment, unit 1 produces an AC voltage source, Vout1. The AC output voltage of unit 1, Vout=Vout1, is connected to the AC input port of unit 2. Unit 2 senses the output current of unit 1, I1, and produces an AC current source, I2. I2 is controlled to be the same as I1, I2=I1. The output of unit 1 and unit 2 provides current I12=I1+I2.

The output terminals of unit 2 are connected to the AC input port of unit 3. Unit 3 senses the output current of combined unit 1 and unit 2, I12=I1+I2, and produces an AC current source, I3, that is half of I12, I3=0.5*(I1+I2)=I1=I2.

The output terminals of unit 3 are connected to the AC input port of unit 4. Unit 4 senses the output current of the combined unit 1, unit 2 and unit 3, $$I123=I1+I2+I3=3*I1 \quad (8.1)$$

and produces an AC current source, I4, that is one-third of I123:

$$I4=I123/3=(I1+I2+I3)/3=I1 \quad (8.2)$$

The load is connected to the inverter output terminals of unit 4. Therefore, the load current is:

$$IRL=I1+I2+I3+I4=4*I1 \quad (8.3)$$

Therefore, when the four PPS units have the same power rating, four times the output power of an individual inverter can be obtained at the load. In the more general case, the total output power that can be delivered to the load is substantially the sum of the output powers of the four PPS units.

Figure 15:
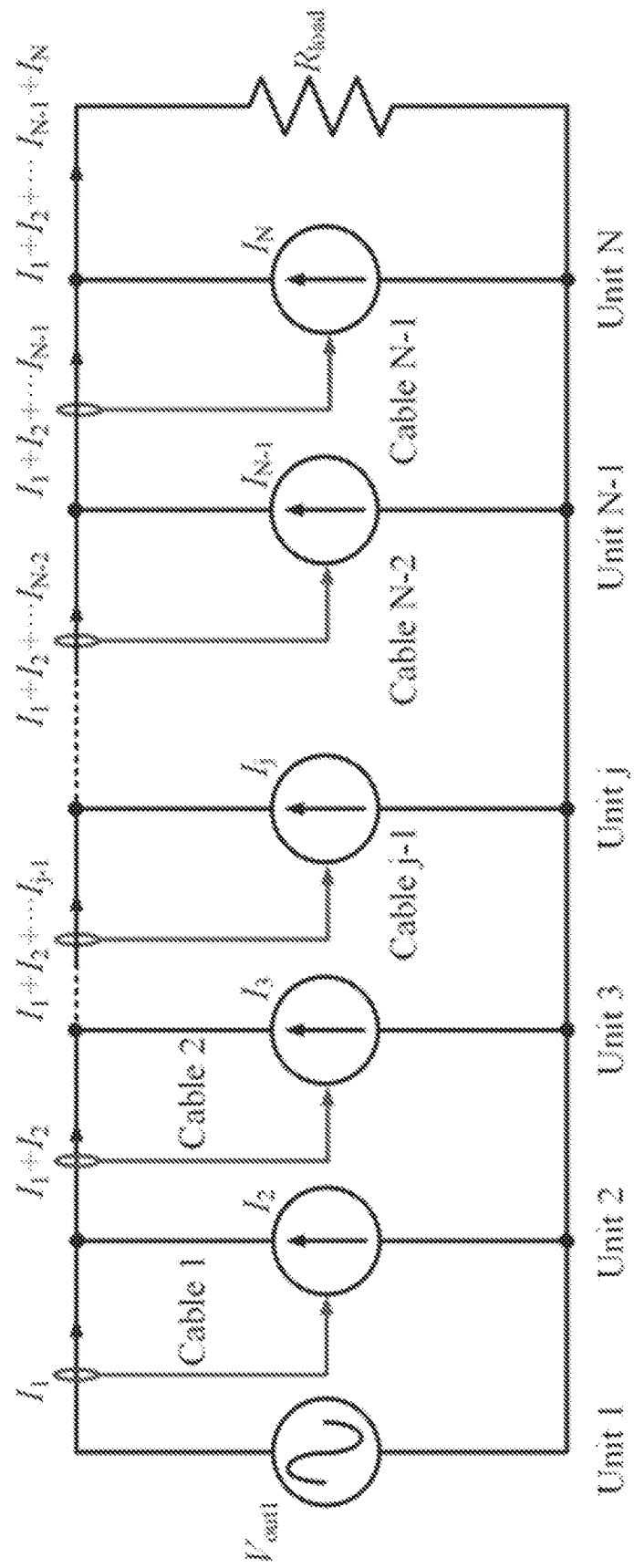
FIG. 15 is an equivalent circuit for parallel operation of N PPS units, wherein unit 1 operates as a voltage source and units 2, 3, j, N−1, and N operate as current sources, according to one embodiment.

Similarly, FIG. 15 is an equivalent circuit for parallel operation of N PPS units, wherein unit 1 operates as voltage source and units 2, 3, . . . , N−1, N operate as AC current sources.

Figure 16:
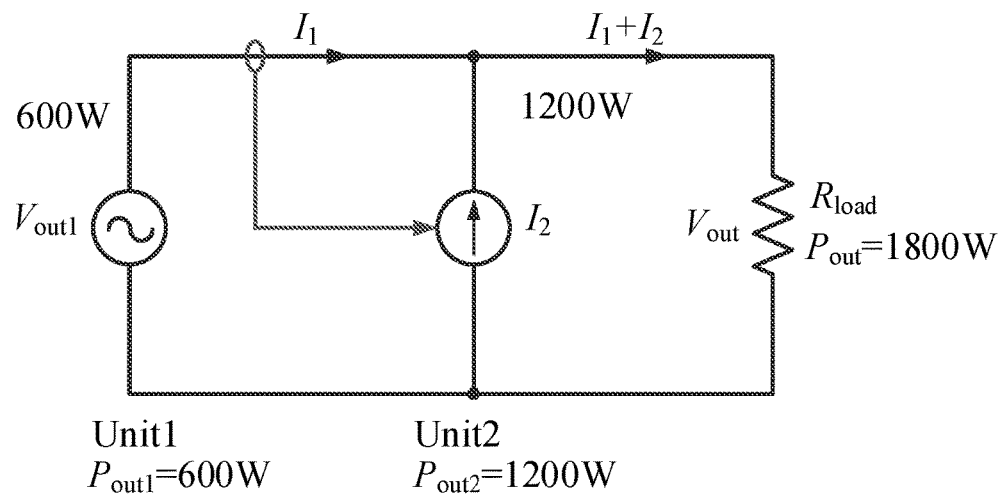
FIG. 16 is an equivalent circuit for parallel operation of two PPS units with different output power ratings, wherein unit 1 operates as a voltage source and unit 2 operates as a current source, according to one embodiment.

FIG. 16 shows an equivalent circuit of parallel connection of two PPS units with different output power rating. In FIG. 16, it is assumed that unit 1 maximum output power is 600 W (Pout1=600 W) and unit 2 maximum output power rating is 1,200 W (Pout2=1,200 W). Unit 1 produces an AC voltage source. Unit 2 senses the output current of unit 1, I1, and, for example, produces two times the current of unit 1:

$$I2=2*I1 \quad (9)$$

Therefore, when Pout1=600 W, Pout 2=1,200 W.

$$Pout=Pout1+Pout2=600+1,200=1,800 \text{ W} \quad (10)$$

Each PPS unit may include an inverter controller, generally referred to herein as a controller, configured to implement a control strategy for its operation. A controller may include an electronic processor and a memory. The processor may include processing capabilities as well as an input/output (I/O) interface through which the processor may receive a plurality of input signals (e.g., current sensing signals, operation mode (voltage or current source) signals) and generate a plurality of output signals (e.g., control/gate drive signals for switches of a DC-AC inverter or a bi-directional inverter, etc.). The memory is provided for storage of data and instructions or code (i.e., an algorithm, software) executable by the processor. The memory may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Each PPS unit may also include a driver circuit or device to interface between outputs of the controller and the control/gate terminals of the semiconductor switches.

Figure 19A:
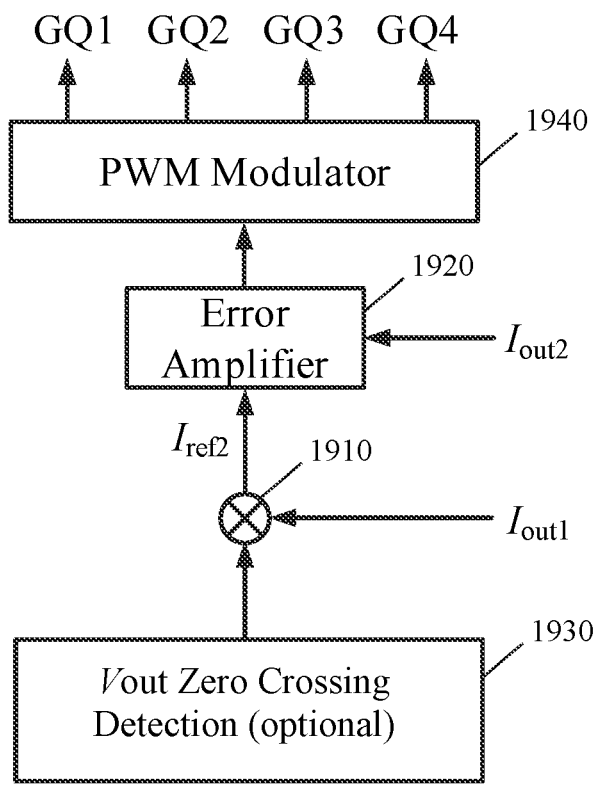
FIG. 19A is a block diagram of a pulse width modulation (PWM) inverter controller with instantaneous current control using the current of inverter 1 as the reference for inverter 2, according to one embodiment.
Figure 19B:
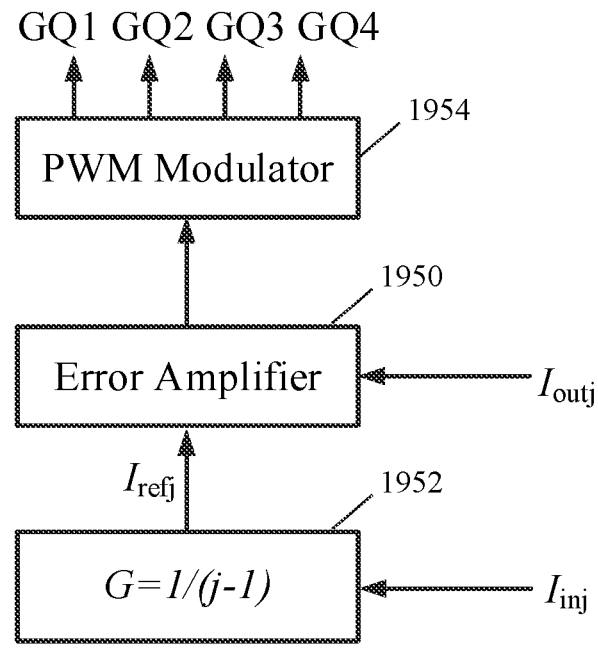
FIG. 19B is a block diagram of a PWM inverter controller for unit j with instantaneous current control, wherein j=2, 3, to N, according to one embodiment.
Figure 21:
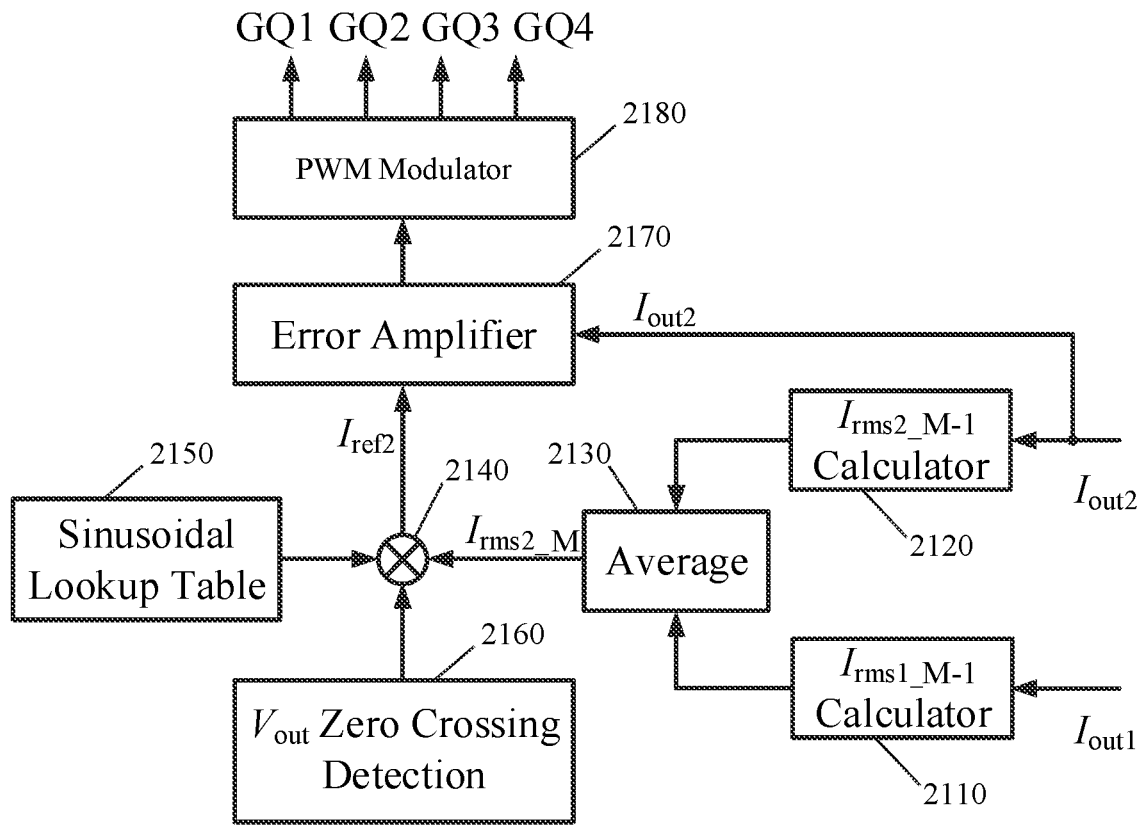
FIG. 21 is a block diagram of a PWM inverter controller with delayed current control for a PPS, according to one embodiment.

The memory may store executable code including control logic which is configured to control the overall operation of a PPS unit in accordance with a desired control strategy. For example, the control logic, when executed by the processor, is configured to generate, in response to one or more input signals, the various control/gate drive signals for the switches of the inverter. Examples of input signals include but are not limited to current reference signals such as Iout1 in FIG. 10 and Iout1 and Iout2 in FIG. 17. The control logic may include programmed logic blocks to implement one or more specific functions, for example, including without limitation, zero crossing detection, error amplifier, pulse width modulation (PWM), power factor correction (PFC), zero voltage switching (ZVS), rms current calculator, operating mode control (current source, voltage source) logic, and startup and/or shut down strategy. The memory may also store, e.g., a sinusoidal or other lookup table that may be accessed by the control logic. Non-limiting examples of control strategies, or parts thereof, that may be implemented in controllers according to embodiments described herein are shown in FIGS. 19A, 19B, and 21.

The controller may be configured to interface with a software application (i.e., an APP) running remotely on a processing device such as a smart phone, tablet, laptop computer or other computer. The controller may be configured for wireless communications with the remote device, with hardware including a transmitter/receiver for a communications platform such as, e.g., WiFi, Bluetooth®, 3G/4G/5G long term evolution (LTE), etc. The APP may allow a user to control power on/off of PPS units as well as certain features of their operation, such as, for example, the designation of PPS units as unit 1, unit 2, etc., corresponding operation as a voltage source or current source, and the APP may provide an interface on the display screen of the device indicating status of the PPS units, such as, for example, which PPS unit is operating as a voltage source and which PPS unit(s) is/are operating as a current source. An example of an APP is described in greater detail below with reference to FIG. 26.

It is noted that a PPS system including two or more PPS units may be configured in different ways. For example, in one embodiment a configuration may include all PPS units being units based on embodiments described herein. In another embodiment a configuration may include the second and subsequent PPS units being units based on embodiments described herein, but the first PPS unit being different than the other units.

Figure 17:
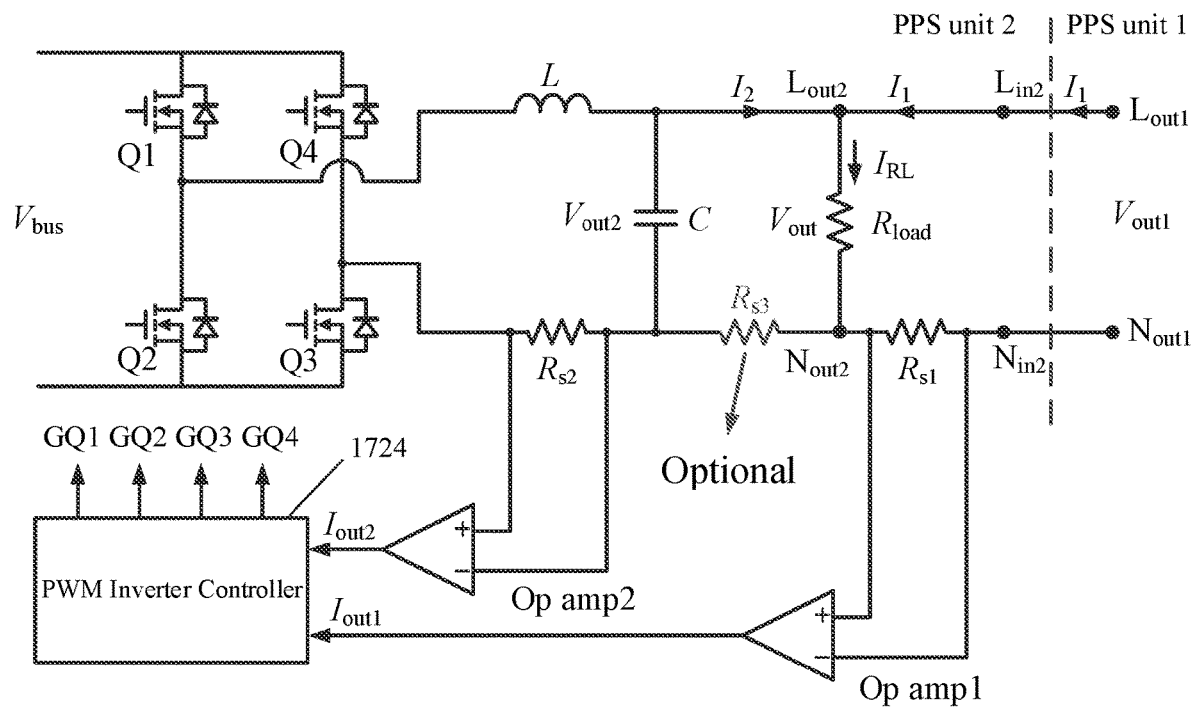
FIG. 17 is a circuit diagram showing details of implementation of a control strategy, according to one embodiment.

FIG. 17 is a diagram showing features of a PPS, including a controller 1724 configured as a PWM inverter controller, and a full bridge non-isolated inverter, according to one embodiment. The full bridge non-isolated inverter may be operated as a one directional inverter or a bi-directional inverter based on the control. FIG. 17 shows the features of a second PPS unit ("unit 2") wherein the AC output of a first PPS unit ("unit 1") Lout1, Nout1 is connected to the AC input Lin2, Nin2 of unit 2. Vbus is the bus voltage of the inverter. Q1, Q2, Q3, and Q4 are the inverter switches, which may be MOSFETs, IGBTs, etc. PWM control is used to generate a sinusoidal output, Vout2. Inductor L and capacitor C form a high frequency filter to remove the switching frequency ripple so that a clean 60 Hz (or 50 Hz) AC voltage can be produced across C, Vout2. Rs2 is a current sensing resistor for the inductor current of unit 2. The output current of unit 2 can also be sensed by Rs3. Rs3 is optional since the value of C is very small and the low frequency current (50 Hz or 60 Hz) is almost same across Rs2 and Rs3.

The AC voltage source of unit 1 (Lout1 and Nout1) is connected to the AC input port of unit 2 (Lin2, Nin2). A current sensing resistor, Rs1, is connected between Nin2 and Nout2. Rs1 is used to sense the output current of unit 1. Lout2 and Nout2 are the output terminals of unit 2 and are connected to the load, RLoad.

The output current of unit 1, I1, which flows inside unit 2 through current sensing resistor Rs1, is sensed by Rs1 and OpAmp1. The output of OpAmp1, Iout1=k*I1, is used as the current reference of inverter 2 of unit 2. The parameter k is the gain between I1 and Iout1.

Rs2 and OpAmp2 produce the actual output current feedback of inverter 2, Iout2=k*I2. Through the PWM inverter controller, Iout2 will follow Iout1:

$$Iout2 = Iout1, \text{ and } I2 = I1 \tag{11}$$

The PWM inverter controller 1724 generates four gate drive signals, GQ1, GQ2, GQ3, and GQ4, to drive the gates of Q1, Q2, Q3, and Q4 so that the inverter 2 output current, I2, follows the inverter 1 output current, I1.

It is noted that only the AC current loop is operating for inverter 2. The PWM inverter controller will control the duty cycles of Q1, Q2, Q3 and Q4 to produce a low frequency AC current, I2, that is same as I1.

It is noted from FIG. 11 and FIG. 17 that since inverter 2 behaves as a current source, even when I2 cannot follow I1 accurately, no circulating current will be generated, and the system will operate close to ideal condition.

Instantaneous Current Control

The above description is applicable to any AC voltage and AC current with any shape. Since the inverter will produce a substantially sinusoidal output current, in the description of this section, it is assumed that all the voltage and current are sinusoidal.

Various control strategies may be implemented in a control algorithm and used for inverter 2, i.e., a parallel-connected inverter operating as a current source. One embodiment is instantaneous current control. Another embodiment is delayed current control. These may be implemented in the inverter controller (e.g., a PWM inverter controller) or in a separate controller. This section describes the operation of instantaneous current control.

Figure 18:
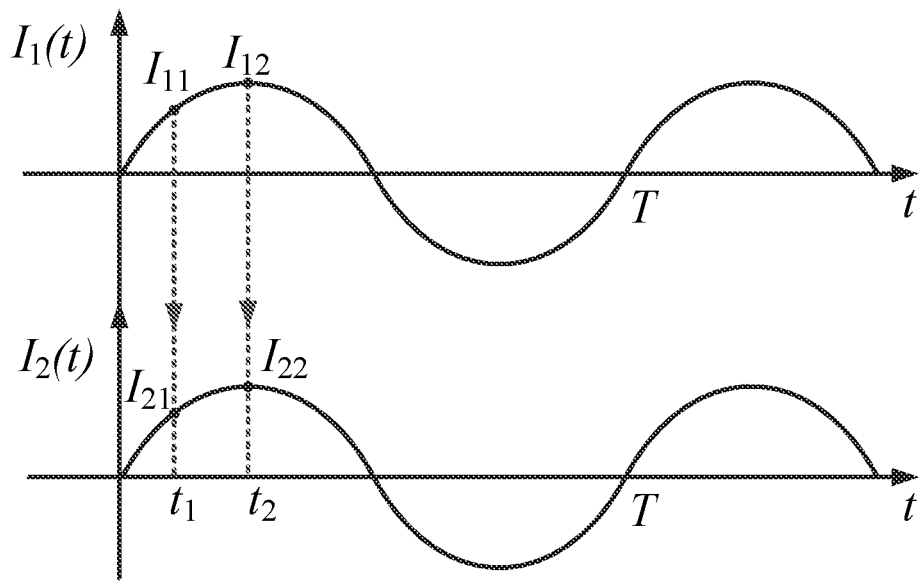
FIG. 18 is a diagram showing typical waveforms of instantaneous current control, according to one embodiment.

FIG. 18 shows typical waveforms of instantaneous current control. The top waveform is the output current of inverter 1 of unit 1, I1(t). The bottom waveform is the output current of inverter 2 of unit 2, I2(t). In the figure, T is the period of the sinusoidal current, which is 20 ms (50 Hz) for Europe and Asia and 16.67 ms (60 Hz) for North America.

The control strategy will force I2(t) to follow I1(t) substantially instantaneously, as shown in the following equation:

$$Iref2(t) = I1(t), \text{ and } I2(t) = Iref2(t) = I1(t) \tag{12}$$

Considering I1(t)=Ipk1*sin(2*π*F*t), then:

$$I2(t) = I1(t) = Ipk1 * \sin(2 * \pi * F * t) \tag{13}$$

wherein F is the sinusoidal frequency, such as 50 Hz or 60 Hz, π=3.14159, a constant.

For example, at t=t1, the instantaneous current value of I1(t) is I11, then the PWM inverter controller of inverter 2 will force the instantaneous output current of inverter 2 to produce I21=I11 at t=t1. At t=t2, the instantaneous current value of I1(t) is I12, then the PWM inverter controller of inverter 2 will force the instantaneous output current of inverter 2 to produce I22=I12 at t=t2.

The instantaneous current control is straightforward to implement. However, its dynamic response is not desired. For example, if I1(t) has a small increase, I2(t) will increase immediately and this will make the voltage across the load, RLoad, increase by a small amount. This will cause disturbance of the voltage loop of inverter 1. In addition, if I1(t) contains a small harmonic component, such as 3rd or harmonic current, I2(t) will also contain same amount of harmonic component, which increases the harmonic content in the load. It is noted that with a proper loop design, the above possible problems can be solved.

FIG. 19A is a block diagram showing features of an instantaneous current control strategy, according to one embodiment. A multiplier 1910 receives an input current reference signal Iout1=k*I1 which is proportional to the output current of inverter 1, I1 (i.e., the output current of PPS unit 1). It is used as the reference current for inverter 2, Iref2=Iout1, so that Iout2=k*I2 will follow Iout1, Iout2=Iout1. An error amplifier 1920 receives the reference current signal Iref2 and an input signal Iout2, which is proportional to I2, (the inductor current of inverter 2). Therefore, Iout2=Iout1 and I2=I1. A zero-crossing detection circuit 1930 of AC voltage Vout is optional. When it is used, it can synchronize the zero-crossing point of the inverter 1 output current. In the following description, zero-crossing detection of AC voltage is not included. The output of the error amplifier 1920 is used by a PWM modulator to determine the appropriate gate drive signals GQ1-GQ4 for the switches of the inverter of PPS unit 2.

When three PPS units are connected in parallel, as shown in FIG. 7, the current reference for unit 2 will be same as expressed in equation (12) and (13) to achieve I2(t)=I1(t). The reference current for unit 3 may be calculated as follows:

$$Iref3 = Iin3/2 = I12/2 = (I1+I2)/2 = (I1+I1)/2 = I1, \text{ and}$$
$$I3 = Iref3 = I1 \tag{13.1}$$

In the above equation, Iin3=I12=I1+I2. It is the input current to the AC Input Port of unit 3, the current through cable 2 in FIG. 7. It is also the current between AC Input Port terminal and Inverter AC Output terminal of unit 3, as shown in FIG. 8 for four PPS units connected in parallel. In FIG. 17, this is the current flowing through Rs1. With the control strategy as shown in equation (13.1), the output current of inverter 3 will be same as the output current of inverter 1 and inverter 2. In this way, the output current of three inverters is controlled to be same.

Similarly, when four PPS units are connected in parallel, the reference current for unit 2 and unit 3 are the same as described above. The reference current for unit 4 is:

$$Iref4=Iin4/3=I123/3=(I1+I2+I3)/3=(I1+I1+I1)/3=I1,$$
$$\text{and } I4=Iref4=I1 \quad (13.2)$$

In the above equation, Iin4=I123=I1+I2+I3. It is the input current to the AC input port of unit 4, the current through cable 3 in FIG. 8. It is also the current between AC input port terminal and inverter AC output terminal of unit 4, as shown in FIG. 8. In FIG. 17, this is the current flowing through Rs1. With the control strategy as shown in equation (13.2), the inverter 4 output current will be same as the output current of inverter 1, inverter 2, and inverter 3. In this way, the output current of four inverters is controlled to be same In the general case, when N PPS units are connected in parallel, unit 1 will produce an AC voltage source. The inverter output of unit 1 is connected to the AC input port of unit 2. The inverter output of unit j is connected to the AC Input Port of unit j+1. In this case, j=1, 2, . . . , N−1. The load is connected to the inverter output of unit N.

The reference current for inverter j, Irefj, j=2, 3, . . . N−1, N, is provided as follows:

$$Irefj=Iinj/(j-1) \quad (13.3)$$

In the above equation, Iinj is the input current to the AC input port of unit j. With the control strategy described in (13.3), the inverter output of each unit will be same:

$$I1=I2=I3= \ldots =I(N-1)=I(N) \quad (13.4)$$

In the above equation, 1(N−1) is the output current of inverter N−1. I(N) is the output current of inverter N.

FIG. 19B is a block diagram showing features of a PWM inverter controller algorithm for unit j with instantaneous current control, where j=2, 3, 4, . . . , N−1, N. According to this embodiment, an error amplifier 1950 receives a reference current signal Irefj and Ioutj, which is proportional to the output current of inverter j. Ij is controlled to be proportional to Irefj, (the input current of unit j). The reference current signal Irefj is determined at 1952 according to a selected function applied to the input current Iinj. As shown in FIG. 15, the input current of unit j is the total output current of unit 1, unit 2, . . . and unit j−1. That is, Iinj=I1+I2+ . . . +I(j−2)+I(j−1). The output of the error amplifier 1950 is used by a PWM modulator 1954 to determine the appropriate gate drive signals GQ1-GQ4 for the switches of the inverter of unit j. It is noted that unit 1 produces an AC voltage source and units j=2, 3, 4, . . . , N−1, N produce an AC current source.

To summarize, when N PPS units are connected in parallel as shown in FIG. 9 and the power ratings of the N units are substantially the same, the output current of each inverter can be shared and the total output power will be N times the output power of each PPS unit when all PPS units have the same power rating. Key features include:

The inverter output of unit j is connected to AC Input Port of unit j+1, where j=1, 2, 3, . . . N−2, N−1. Unit 1 (j=1) produces an AC voltage source and units 2, 3, . . . , j−1, j, j+1, . . . N−1, N produce AC current source.

Inverter 1 produces an AC voltage source.

Inverter j, j=2, 3, 4, . . . , N−1, N, produces an AC current source.

The reference current for inverter j, j=2 to N, is based on equation (13.3)

Then:

$$I1=I2= \ldots =Ij, \ldots =I(N-1)=I(N) \quad (13.5)$$

$$Pout=N*\text{Peach} \quad (13.6)$$

In the above equations, Ij is the output current of inverter j. Peach is the output power of each PPS unit. Pout is the total output power of the N PPS unit system.

The above description assumes that the load is a resistor. The above control strategy can also be applied for inductive load, capacitive load, and non-linear load. In these cases, it is required that the inverter will be able to produce inductive load, capacitive load, or non-linear load.

Parallel Connection of Units with Different Output Power

In some cases, it is desired to connect two PPS units with different power rating together to produce more power.

For example, it is assumed that unit 1 can produce 600 W output power and unit 2 can produce 1,200 W output power. When these two PPS units are connected in parallel, 1,800 W can be delivered to the load.

In this case, it is desired that unit 1 (the unit with lower output power) produces an AC voltage source and unit 2 produces an AC current source. An equivalent circuit diagram of the connection is shown in FIG. 16. Since inverter 2 can produce double the current of inverter 1, the reference current for inverter 2 may be set as follows:

$$Iref2=I2=2*I1 \quad (13.7)$$

In this way, inverter 2 will produce double the output current (double the output power) as compared with inverter 1.

Delayed Current Control

According to one embodiment, a PPS unit controller may include a delayed current control algorithm. Delayed current control may be implemented to make the system stable. With delayed current control, the output current of inverter 2 at one line period is controlled to be same as the output current of inverter 1 in a previous line period. One implementation is as follows:

$$I2\_M(t)=Iref2\_M(t)=I1\_(M-1)(t)=Ipk1*\sin(2*pi*F*t-360 \text{ degree}) \quad (14)$$

Figure 20A:
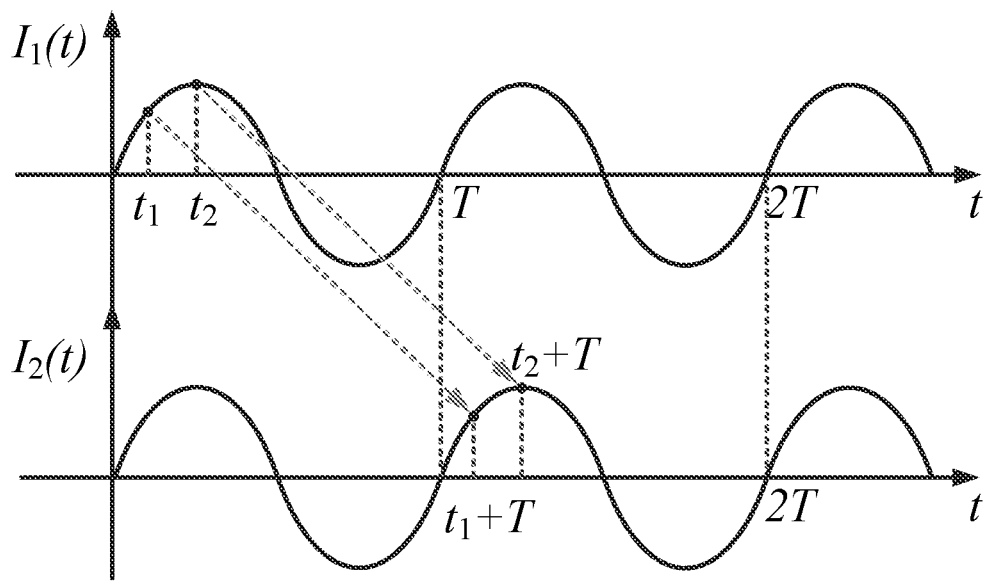
FIGS. 20A and 20B are diagrams showing waveforms of delayed current control, according to two embodiments.

In the above equation, M refers to the line period M. M−1 means the previous period of M.−360 degree means the value at previous period. FIG. 20A shows waveforms of delayed current control according to this embodiment.

Figure 20B:
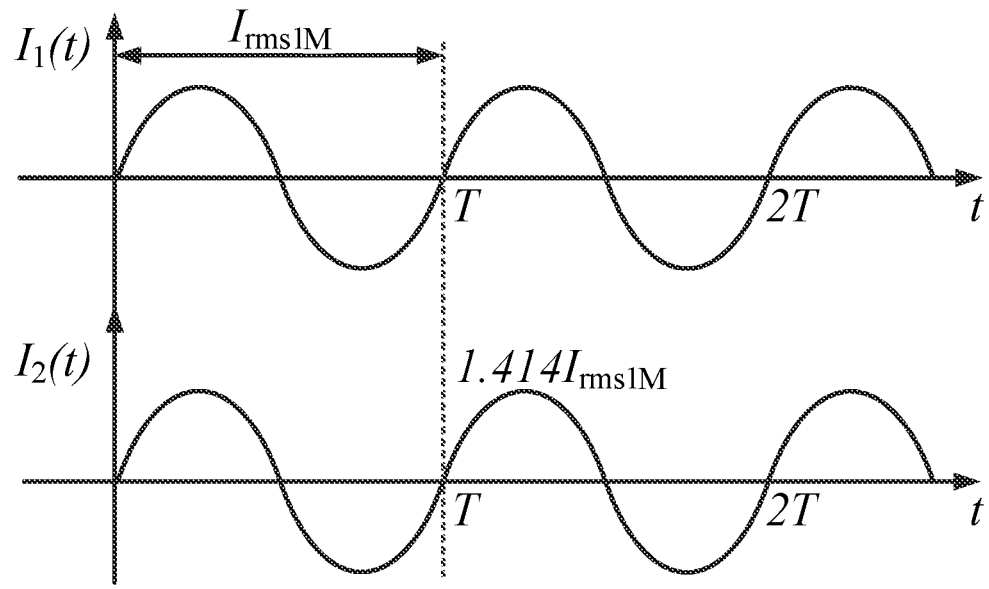

FIG. 20B shows waveforms of another form of delayed current control, according to another embodiment. The rms value of I1(t) is calculated for period M as Irms1_M and then the current reference for I2(t) in the next period is generated from a look up table with pure sinusoidal waveform with rms value of Irms1_M. Therefore, the rms value of inverter 2 output current in next period is same as the rms value of inverter 1 output current at the previous period. It is noted that the rms value of the load current is IRload=Irms1+Irms2.

It is noted that in order to reduce the calculation time, average of the absolute value of I1(t), |I1(t)|, from 0 to 360 degrees may be calculated which is directly proportional to the rms value of I1(t). When average value is used, neither square nor square root calculation is needed. The rms value is used as an example to illustrate the control strategy.

The above embodiments show how the output current of inverter 2 may be controlled at steady state operation when the load current does not change. In practical cases, considering that the load current may change unpredictably, the reference current of inverter 2 may also be constructed as:

$$I2(t)\_n=0.5*I1(t)\_(n-1)+0.5*I2(t)\_(n-1) \quad (15)$$

In the above equation, n indicates the current switching cycle, n−1 indicates the previous switching cycle. The current I1(t)_(n−1) is the input current from the AC input port of unit 2. According to the above equations the reference current of inverter 2 at the current switching cycle is the average value of the actual current of inverter 1 and inverter 2 at previous switching cycle.

For three PPS units connected in parallel, the reference current for unit 2 is constructed as:

$$I2(t)\_n=0.5*I1(t)\_(n-1)+0.5*I2(t)\_(n-1) \quad (15.1)$$

In the above equation, I1(t)_(n−1) is the input current from the AC input port of unit 2 at previous switching cycle. I2(t)_(n−1) is the inverter 2 output current at previous switching cycle. The reference current for unit 3 is constructed as:

$$I3(t)\_n=0.25*I12(t)\_(n-1)+0.5*I3(t)\_(n-1) \quad (15.5)$$

In the above equation, I12(t) is the input current from the AC input port of unit 3. The current I12(t)=I1(t)+I2(t). The current I3(t) is the inverter 3 output current. The term (n−1) means the value in previous switching cycle.

Considering that the output voltage and current is always sinusoidal, the following equation gives another method to generate the reference current of inverter 2:

$$Irms2\_M=0.5*Irms1\_(M-1)+0.5*Irms2\_(M-1) \quad (16)$$

The above equation shows that the rms value of the reference current of inverter 2 at line period M is the average of the actual rms value of inverter 1 and inverter 2 in the previous line period, M−1.

The embodiment of FIG. 21 is a block diagram of a PWM inverter controller algorithm to implement the control strategy described by equation 16 above. In the figure, Iout1 represents the output current of inverter 1. It is the output of the OpAmp1, as shown in FIG. 17. Iout2 represents the output current of inverter 2. It is the output of the OpAmp2, as shown in FIG. 17.

Referring to FIG. 21, Iout1 and Iout2 for line period M−1 are sensed and the rms values, Irms1_(M−1) and Irms2_(M−1) are calculated at 2110 and 2120, respectively. At 2130 Irms2_M is calculated according to equation (16). Irms2_M is multiplied at 2140 by a value from the sinusoidal look up table 2150 to generate the sinusoidal waveform with rms value of Irms2_M. The reference current for inverter 2 may be calculated as follows:

$$Iref2(t)=1.414*Irms2\_M*\sin(2*pi*F*t) \quad (17)$$

The starting point (zero crossing point) at 2160 of the sinusoidal waveform is the same as the zero-crossing point of the output voltage of inverter 1, which is the same as the output voltage across the load.

The error amplifier 2170 shown in the embodiment of FIG. 21 serves the current feedback loop so that Iout2 can follow the reference current Iref2 tightly. The output of the error amplifier 2170 is used by a PWM modulator 2180 to determine the appropriate gate drive signals GQ1-GQ4 for the switches of the inverter of unit 2. Then the output current of inverter 2, I2, will be same as the output current of inverter 1, I1.

It is noted that in equation (17) and in FIG. 21, it is assumed that the second phase reference current is at same phase as the voltage.

The starting point of the reference current of inverter 2 can also lag or lead 0 degree of the zero-crossing point of the output voltage, Vout, as shown in the following equation:

$$Iref2(t)=1.414*Irms2\_M*\sin(2*\pi*F*t-\theta) \quad (18)$$

With the control law described by equation (18), inverter 2 will provide an inductive current for an inductive load. In most applications, the PPS will provide a resistive load.

In equations (16), (17), (18), the reference current for inverter 2 in next line period depends on the rms value of its AC input port and its output current in previous line cycles. The reference current can also depend only on the AC input port current as shown below:

$$Irms2\_M=Irms1\_(M-1), Iref2(t)=1.414*Irms2\_M*\sin(2*3.14*F*t) \quad (18.1)$$

Inductive Load

For an inductive load, the load current will lag (delay) the output voltage by α degree. The phase of the reference current for inverter 2 can be determined as following steps:

Step 1: Set the reference current of inverter 2 the same as the output voltage Step 2: Measure the phase difference between the output current of inverter 1, I1(t), and output current of inverter 2, I2(t). Assume the measured phase difference is α1.

Step 3: Set the phase delay of the reference current of inverter 2 as 0.5*α1 in next line period.

Step 4: Repeat step 2 and step 3 continuously until the phase difference between these two currents reaches zero, or a very small value, such as less than 5 degrees, or less than 3 degrees.

Under steady state, the phase difference between 11 and 12 will be zero. But the phase difference between I1 (and I2) and output voltage (Vout) will be a.

Parallel Connection of Units with Different Output Power

In some cases, it is desired to connect two PPS units with different power rating together to produce more power. For example, it is assumed that unit 1 can produce 600 W output power and unit 2 can produce 1,200 W output power. When these two PPS units are connected in parallel, 1,800 W can be delivered to the load.

In this case, it is desired that unit 1 (the unit with lower output power, 600 W in this case) produces an AC voltage source and unit 2 produces an AC current source. An equivalent circuit diagram of the connection is shown in FIG. 16. The rms current value of the reference current of inverter 2 (1,200 W inverter) may be calculated as follows:

$$Irms2\_M=Irms1\_(M-1)+0.5*Irms2\_(M-1) \quad (19)$$

Control Strategy with Three Units in Parallel

FIG. 13 is an equivalent circuit diagram of three PPS units connected in parallel. In this case, the current flowing into the AC input port of unit 2 is I1. The rms value of the reference current for unit 2 may be determined as follows:

$$Irms2\_M=0.5*Irms1\_(M-1)+0.5*Irms2\_(M-1) \quad (20.1)$$

By the control law of equation (20.1), Irms1=Irms2 is achieved.

The output of unit 2 will provide current of I1+I2, which is the input current to the AC input port of unit 3. That is, $$Irms\_ac2=Irms1+Irms2 \quad (20.2)$$

Therefore, the rms value of the reference current for unit 3 may be determined as follows:

$$Irms3\_N=0.25*Irms\_ac2\_(M-1)+0.5*Irms3\_(M-1) \quad (20.3)$$

It is noted that Irms_ac2 is 2×Irms1. Therefore, by control law of equation (20.2) and (20.3), Irms1=Irms2=Irms3 can be achieved.

The inverter output current can also be controlled in the following ways:

$$Irms2\_M=Irms1\_(M-1) \quad (21.1)$$

$$Irms3\_M=0.5*Irms12\_(M-1) \quad (21.2)$$

In the above equation, Irms12 is the AC input port current of unit 3.

The inverter output current can also be controlled in the following ways:

$$I2(t)=I1(t), \text{ or } I2(t)\_n=I1(t)\_(n-1) \quad (22.1)$$

$$I3(t)=0.5*I12(t), \text{ or } I3(t)=0.5*I12(t)\_(n-1) \quad (22.2)$$

In the above equations, I12(t) is the AC input port current of unit 3. In some embodiments, where the controller is implemented with a sample and hold circuit, the value of the previous switching cycle is used as the reference of the current switching cycle.

Similarly, when four units are connected in parallel, the rms value of the reference current for each unit may be determined as follows:

For unit 2:
$$Irms2\_M=0.5*Irms1\_(M-1)+0.5*Irms2\_(M-1) \quad (23.1)$$

For unit 3:
$$Irms3\_M=0.25*Irms\_ac2\_(M-1)+0.5*Irms3\_(M-1) \quad (23.2)$$

For unit 4:
$$Irms4\_M=0.1667*Irms\_ac3\_(M-1)+0.5*Irms4\_(M-1) \quad (23.3)$$

In the above equations, $$Irms\_ac2=Irms1+Irms2=2*Irms1 \quad (24.1)$$

$$Irms\_ac3=Irms\_ac2+Irms3=Irms1+Irms2+Irms3=3*Irms1 \quad (24.2)$$

Unit 1 will produce an AC voltage source. Unit 2, unit 3, and unit 4 will each produce an AC current source.

For each current source unit, after the attenuation, the current from the AC input port should be approximately half of the output current of that unit. For example, for unit 2, an attenuation factor of 0.5 (½) may be used; for unit 3, an attenuation factor of 0.25 (¼) may be used; for unit 4, an attenuation factor of 0.1667 (⅙) may be used.

Based on the above embodiments, methods to create the reference current for the AC current source units may include one of the following:

(1) The reference current depends on the rms current value of both the AC input port current and inverter output current in the previous AC line period, such as equations (23.1) (23.2).
(2) The reference current depends on only the rms value of the AC input port current in the previous AC line period, such as equation (18.1).
(3) The reference current depends on both the current value of both the AC input port current and inverter output current at previous switching cycle, such as equation (15.1), (15.2).
(4) The reference current depends only on the current value of the AC input port current at previous switching cycle, such as equation (22.1), (22.2).

It is noted that instantaneous current control, as described by equations (12), (13), (13.1), (13.2), and (13.3), can provide better performance as compared with delayed current control. Therefore, instantaneous current control may be preferred in some applications.

It is noted that Unit 1 produces an AC voltage source and all the other units, unit 2, unit 3, unit 4, etc., produces an AC current source. In addition, the AC Input Port current can be measured by that unit, as shown in FIG. 17, as the voltage across Rs1.

Start Up and Shut Down Strategy

If two PPS units are connected in parallel as described in this specification and the maximum output power of each unit is 600 W, then 1,200 W can be delivered to the load. During start up, these two PPS units typically do not start at same time. One PPS unit will start up first and the other PPS unit will start up later. Therefore, if no suitable start up procedure is used, the unit starting up first will carry 1,200 W and it will be shut down by over current protection. The following is an embodiment of a start up procedure that may be implemented in a controller.

It is assumed that two 600 W PPS is connected in parallel and the output voltage is 220V. Therefore, the total load current is 5.5 A and total of 1,200 W load power is delivered by these two PPS units. It is also assumed that the load is a resistor with value R. The analysis for other types of loads, such as inductive or capacitive load, is the same.

According to this embodiment, a soft start up strategy is provided. The details are described below using two PPS units in parallel with reference to the voltage and current waveforms shown in FIG. 23 and the connection as shown in FIG. 6 with the above power and voltage assumption.

Figure 23:
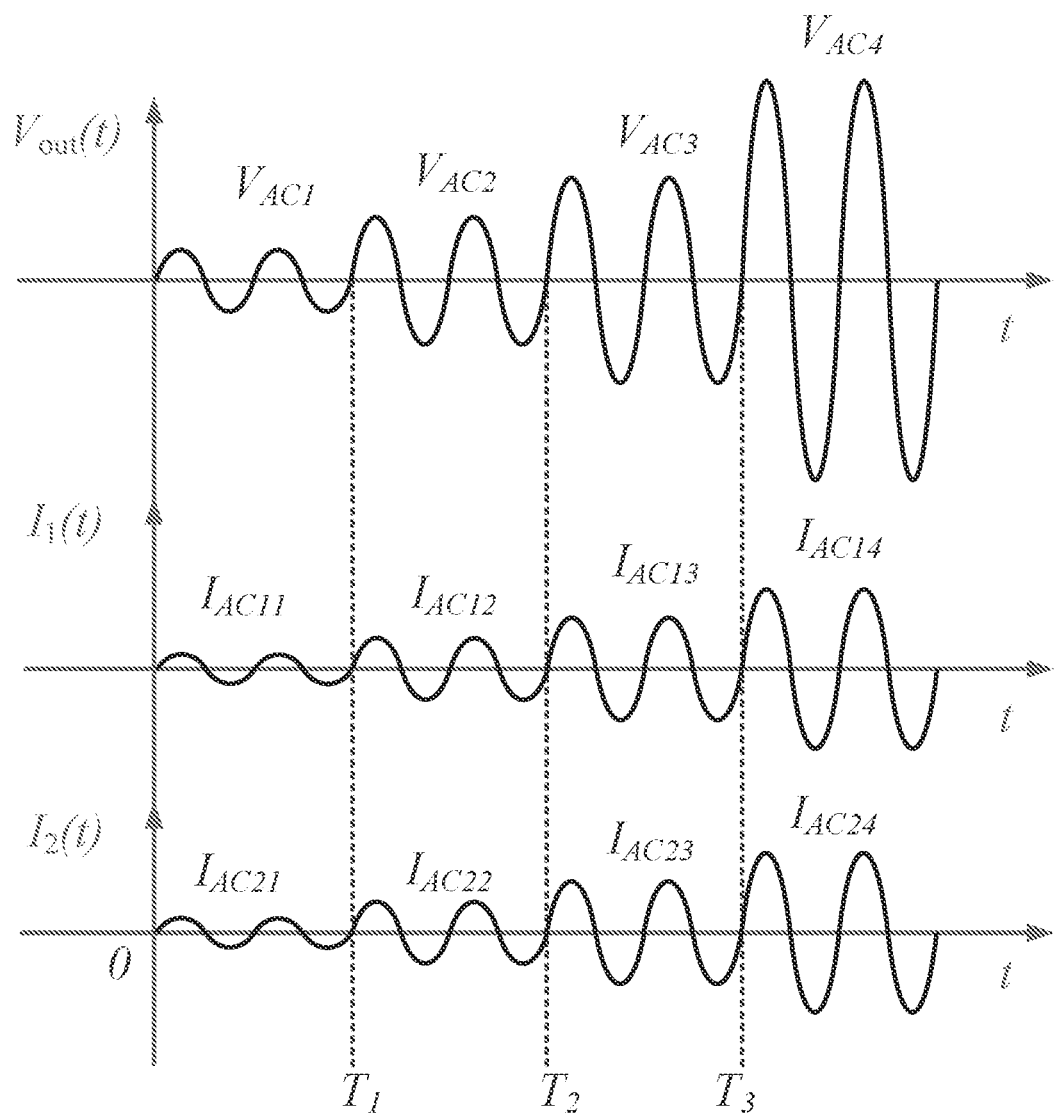
FIG. 23 is a diagram showing voltage and current waveforms during a soft start up mode with instantaneous current control, according to one embodiment.

During start up, the output voltage of inverter 1 will be regulated at VAC1 at first and stay at VAC1 for several line periods (e.g., 2 to 5 line periods), as shown in FIG. 23. VAC1 is much lower than the steady state output voltage. For example, for 220V output, VAC1 may be 50V. In FIG. 23, the output voltage of inverter 1 is regulated at VAC1 for, e.g., two line-periods. Inverter 2 will start up as soon as an AC voltage is applied to its AC Input Port. It will produce an AC current the same as the output current of inverter 1, as shown below:

$$IAC21=IAC11, IRL1=IAC11+IAC21, \text{ for } t=0 \text{ to } T1 \quad (24A)$$

During this time interval (between 0 and T1), output current of inverter 2 is settled down to be same as the output current of inverter 1.

At t=T1, the output voltage of inverter 1 is increased to VAC2, then the output current of inverter 1 and inverter 2 will be:

$$IAC22=IAC12, IRL2=IAC12+IAC22, \text{ for } t=T1 \text{ to } T2 \quad (24B)$$

At t=T2, the output voltage of inverter 1 is increased to VAC3, then the output current of inverter 1 and inverter 2 will be:

$$IAC23=IAC13, IRL3=IAC23+IAC13, \text{ for } t=T2 \text{ to } T3 \quad (24C)$$

At t=T3, the output voltage of inverter 1 is increased to its steady state value, such as VAC4=220V, then the output current of inverter 1 and inverter 2 will be:

$$IAC24=IAC14, IRL4=IAC24+IAC14, \text{ for } t>T3 \quad (24D)$$

In the above description, VAC1<VAC2<VAC3<VAC4. Some key points of this soft-start strategy are described below:

1: The AC voltage change will start at zero crossing point of the sinusoidal waveform to reduce the current overshoot.

2: During each step, the rms value of the output voltage of inverter 1 remains constant for several line periods. During this period, current sharing between inverter 1 and inverter 2 can be achieved. In FIG. 23, a time interval of two line-periods is shown as an example.

With the above soft start up strategy, the output current of each inverter will be less than its maximum output current.

The above describes an embodiment of a the start up operation using the example of two PPS units connected in parallel. In the general case, with N units of PPS connected in parallel, the same start up strategy can be applied, as summarized below:

Step 1: The output voltage of inverter 1 produces an AC voltage, VAC1, that is much lower than the steady state voltage.

Step 2: When the AC voltage is applied to the AC input port terminals, all other connected inverters will start up and share the load current according to the control strategy described by equation (13.3).

Step 3: Inverter 1 will maintain VAC1 for a certain period, such as several line periods. During this period, all the units will achieve current sharing.

Step 4: Inverter 1 will increase its output voltage to VAC2>VAC1 and maintain VAC2 for a certain period, when all the units will achieve current sharing.

Step 5: Repeat step 4 when the output voltage of inverter 1 reaches the steady state value and start-up process is completed.

For example, if the steady state AC voltage is 220V, one embodiment may set the start up voltage to four or five voltage steps before the steady state voltage is reached, such as, e.g., 50V, 100V, 150V, 200V and then 220V. Similarly, if the steady state AC voltage is 110V, one embodiment may set the start up voltage to three or four voltage steps before the steady state voltage is reached, such as, e.g., 50V, 100V, and then 110V.

Different approaches may be used to stop the parallel operation of multiple PPS units connected in parallel, as described in the below embodiments.

Method 1: A user turns off unit 1 and its AC voltage will reduce to zero. When no voltage is applied at the AC input port of the other connected units, the other units (operating as AC current source) will turn off.

Method 2: A user turns off the parallel connected system of PPS units using a software application (APP) running on a device such as a computer, tablet, or smart phone. The APP will send a turn off command to all the PPS units. The unit 1 will be turned off and no AC voltage is applied to the AC input port of all the other units (operating as AC current source).

The above soft start up can also be used for delayed current control. The details are described below using two PPS units in parallel with reference to the voltage and current waveforms shown in FIG. 22 and the connection as shown in FIG. 6 with the above power and voltage assumptions.

Figure 22:
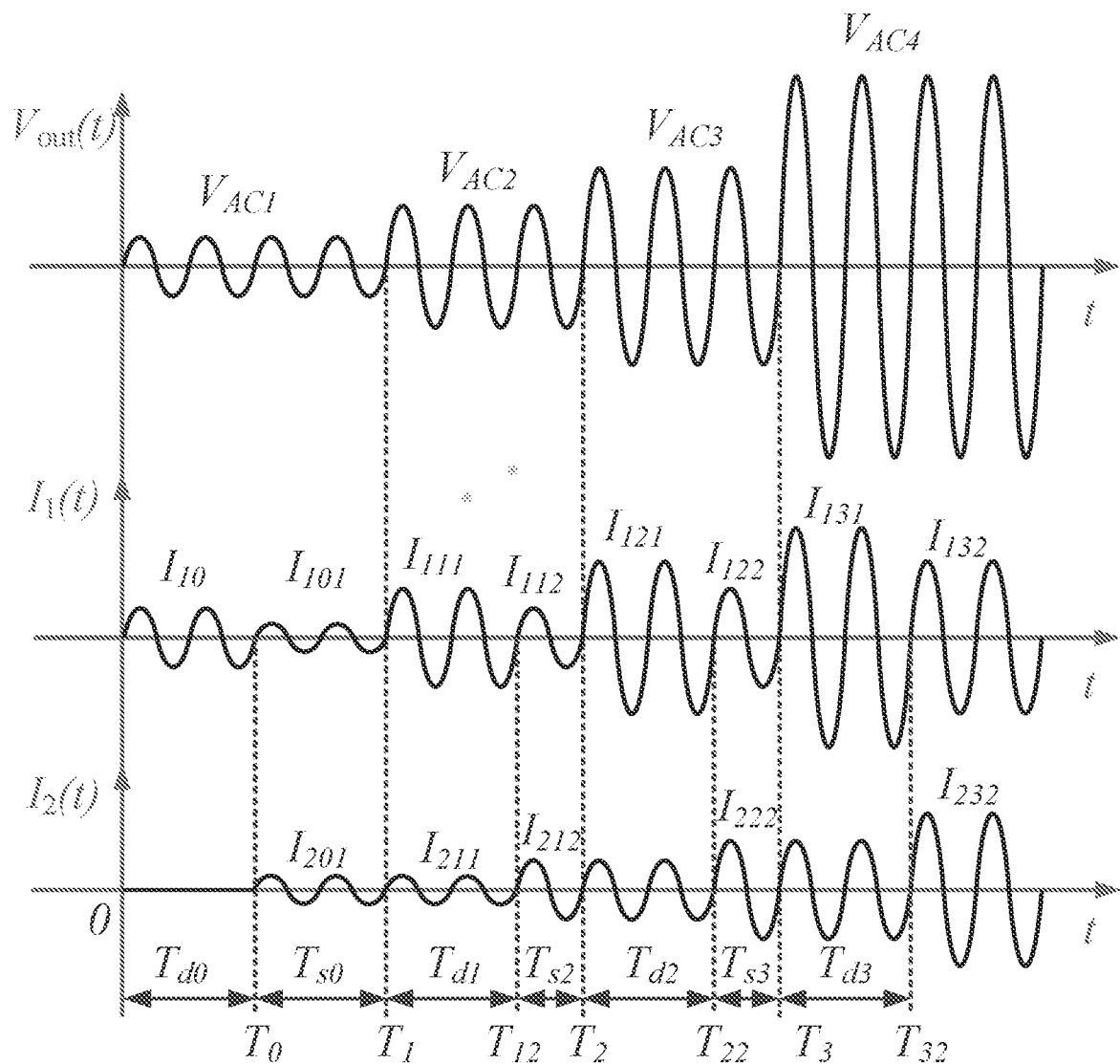
FIG. 22 is a diagram showing voltage and current waveforms during a soft start up mode, according to one embodiment.

As discussed above, unit 1 produces an AC voltage source and unit 2 will produce an AC current source. During start up, unit 1 will produce an AC voltage with rms value of VAC1, as shown in FIG. 22. Then, unit 1 will provide all the load current (IR), with rms value of 110.

$$I10=IR1=VAC1/R \quad (25)$$

At time T0, unit 2 starts to operate and generates half of the load current. Therefore, unit 1 and unit 2 will produce same current.

$$I101=I201=0.5*I10 \quad (26)$$

At t=T1, unit 1 will produce a higher voltage, VAC2, and the load current will be higher:

$$IR2=VAC2/R \quad (27)$$

Since unit 2 still provides the same current=I201, unit 1 will provide the increased load current as:

$$I111=IR2-I201 \quad (28)$$

After a delay time of Td1, as defined as $$Td1=T12-T1 \quad (29)$$

As an example, Td1 is 2 line periods. This is for illustration. In actual practice, considering the transient process, a delay time of 5 to 10 line periods is needed.

At t=T12, unit 2 starts to share half of the load current with unit 1. Then:

$$I212=I112=0.5*IR2 \quad (30)$$

At t=T2, the output voltage of unit 1 increases to VAC3. After T2, the extra load current is delivered by unit 1. After delay time Td2, at t=T22=T2+Td2, unit 2 starts to share current with unit 1 and delivers half of the load current:

$$I222=I122=0.5*IR3/2=0.5*VAC3/R \quad (31)$$

It is noted that during Td2, (from T2 to T22), unit 2 produces I212.

At time t=T3, it is assumed that the output voltage of unit 1 increases to its steady state value of VAC4 (e.g., 220V for Europe, China). Similarly, after T3, the extra load current is delivered by unit 1. After delay time Td4, at t=T32=T3+Td3, unit 2 starts to share current with unit 1 and delivers half of the load current:

$$I232=I132=0.5*IR4=0.5*VAC4/R \quad (32)$$

With the reduced voltage start-up strategy described above, the current in each PPS unit increases slowly and over current operation can be avoided.

In more general terms, the soft start up strategy may be described as follows:

Step 1: the output voltage of unit 1 is regulated at a voltage level lower than its steady state output voltage.

Step 2: unit 2 starts up after a short delay and then shares the current with unit 1.

Step 3: Output voltage of unit 1 increases and unit 2 starts to share current with unit 1 after another short delay time.

Step 4: Output voltage of unit 1 increases to its steady state value and unit 2 shares current with unit 1 and provides half the load current.

The following are features of the soft start up strategy:

(1) The output voltage of unit 1 increases step by step from a low voltage value to steady state value.

(2) The output voltage of unit 1 is maintained at the same level for several line periods, when current sharing of these units will be achieved.

It is noted that the above start up steps may be divided into two major operation modes: sharing mode and delay mode. As shown in FIG. 23, for sharing mode operation, unit 1 and unit 2 shares the load current instantaneously. During delay mode, as shown in FIG. 22, unit 1 delivers more current than unit 2 initially and then share the current later on. The two units operate between sharing mode and delay mode until the output voltage of unit 1 reaches the steady state value.

The above description is for parallel operation of two PPS units. When three PPS units operate in parallel, unit 1 will produce an AC voltage source and unit 2 and unit 3 will produce an AC current source. In this case, another share operation mode and another delay operation mode are implemented for unit 3.

When unit 1 produces an AC voltage, VAC1, unit 2 will produce an AC current source after a delay operation mode of unit 2. Unit 2 will operate at share mode when unit 1 and unit 2 will share the additional load current, and during this time period unit 3 will operate at delay operation when unit 1 and unit 2 are sharing the current. After unit 1 and unit 2 achieve current sharing, unit 3 starts to share the load current with unit 1 and unit 2. This process is repeated until the output voltage of unit 1 reaches steady state value.

For the above operation, unit 2 and unit 3 enter sharing operation mode one after another (unit 2 first and unit 3 later) after the output voltage of unit 1 increased. This operation mode is referred to herein as sequential sharing mode.

According to another embodiment, a start-up strategy is that unit 2 and unit 3 enter sharing mode at the same time. With this start-up strategy, unit 2 and unit 3 start to share load current with unit 1 at the same time. It is expected that after a few line-periods, the three units will share load current equally. Then, the output voltage increases, and current sharing operation starts again. The process ends when unit 1 produces the steady state output voltage. This operation mode is referred to herein as simultaneous sharing mode.

Similarly, for four or more PPS units connected in parallel, either sequential or simultaneous sharing mode can be used at start-up.

With the start-up strategy described above, multiple PPS units can start up together without over current conditions. It is noted that in practical implementation, the delay time can be selected as 2 to 5 line periods. The sharing time can be selected as 5 to 10 line periods. The line period is 20 millisecond for 50 Hz grid system and 16.67 millisecond for 60 Hz grid system.

The above-described soft start up strategy is an effective way to start the parallel system to avoid overload condition of each unit. When three or more units are connected in parallel, the time interval when the AC voltage stays at Vac1, Vac2, should be increased so that current sharing among three or more units has been achieved during this time period. Then the AC voltage is increased to the next level.

It is also noted that PPS unit 1 produces an AC voltage source and the other PPS units produce AC current source.

Set Up of a Parallel Connected PPS System

In a system with multiple (i.e., two or more) connected PPS units, the units must be designated or identified as unit 1, unit 2, unit 3, etc., since, according to embodiments described herein, unit 2, unit 3, etc., must be designated as the units which operate as current sources. In other embodiments, one unit must be designated as the unit which operates as a voltage source (referred to as unit 1) and the other unit(s) are designated as units 2, 3, etc. which operate as current source(s). The identification of each unit can be done in several ways. For example, one way is to use indication switches (e.g., S1 and S2) in the panel of the PPS to indicate which unit it is, such as unit 1, or unit 2, or unit 3, etc. In one embodiment, indication switches S1 and S2 may be implemented with dip switches with two positions, up and down. For example, in the embodiment shown in FIG. 24, for unit 1 the switch positions of S1 and S2 are both down and this combination may be used to indicate unit 1. For PPS unit 2, the position of S1 is down and the position of S2 is up and this combination may be used to indicate unit 2.

Figure 25:
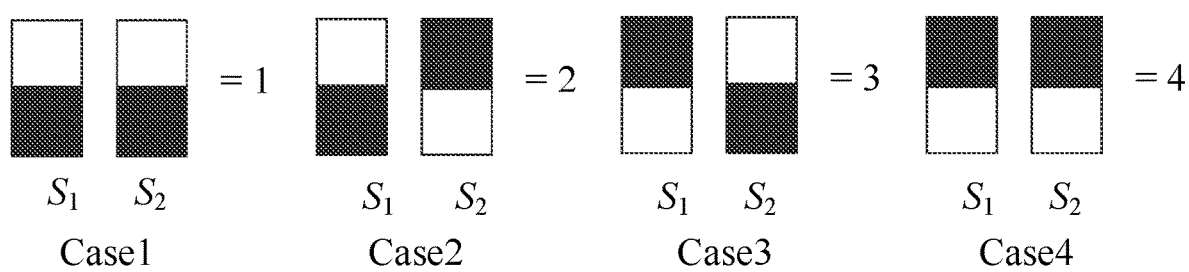
FIG. 25 is an illustration showing how two DIP switches may be used to designate up to four PPS units, according to one embodiment.

FIG. 25 shows that with two dip switches (indication switches), S1 and S2, four units can be identified by the combination of positions of these two dip switches. When the position of S1 is up and the position of S2 is down, the combination indicates unit 3. When the positions of both S1 and S2 are up, the combination indicates unit 4. In other embodiments other types of switches (e.g., rotary, push-button) or other selectors may be used. The switch positions are used as input to the control algorithm of the controller of each PPS unit, e.g., as input to a processor of the controller, to determine the mode of operation of each unit, wherein unit 1 operates as a voltage source and the other unit(s) operate as current source.

Figure 26:
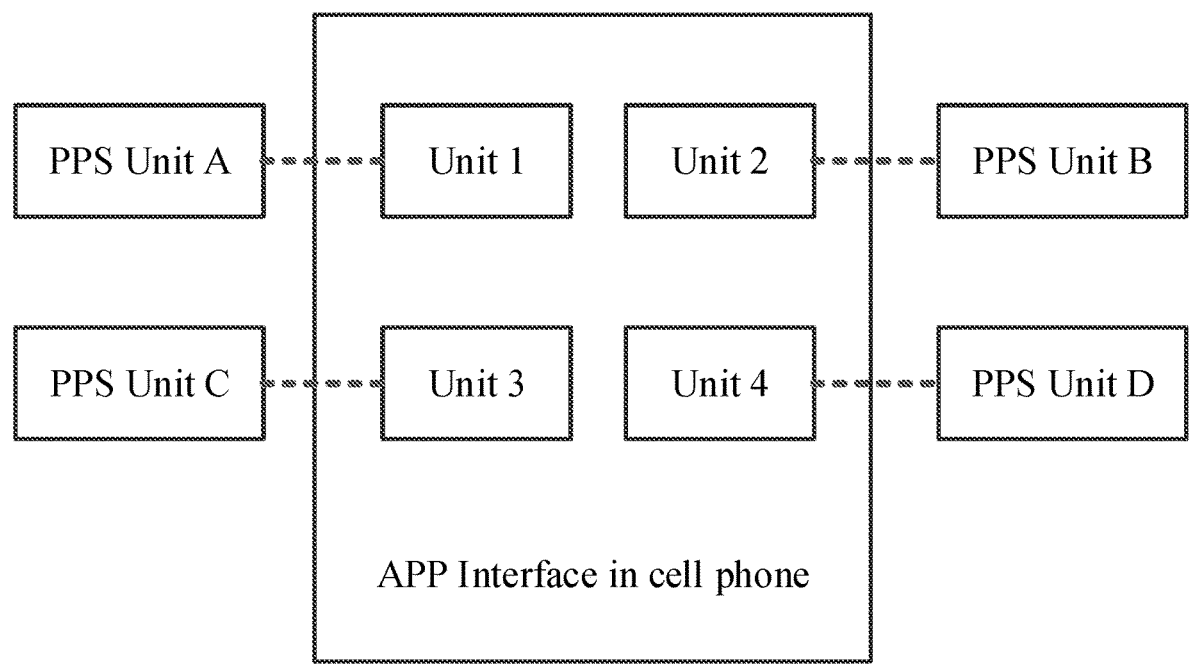
FIG. 26 is an illustration showing icons on a screen of a device as presented by an APP used to control multiple PPS units, according to one embodiment.

Another way to identify the unit sequence is to use an APP interface running on a device such as a cell phone, tablet, or computer (i.e., a "processor"). Provided herein is an APP, i.e., a software application comprising computer code stored on non-transitory computer readable media compatible with the cell phone, tablet, or computer. The controller of each PPS communicates with the APP (e.g., wirelessly, such as by WiFi or Bluetooth®) and the APP assigns each unit as unit 1, unit 2, unit 3, etc., according to the connection, as shown in FIG. 26. In the figure four PPS units (unit A, unit B, unit C, and unit D) are connected in parallel, however, there may be other numbers of PPS units. The boxes containing the unit number (unit 1, unit 2, etc.) are the icons presented on the device screen by the APP for each unit. Dotted lines may be used to indicate the assignment of each PPS unit. In the example of FIG. 26, PPS unit A is assigned as unit 1. PPS unit B is assigned as unit 2. PPS unit C is assigned as unit 3. PPS unit D is assigned as unit 4. The control algorithm contained in the controller of unit A will control the operation of unit A to generate an AC voltage source. The control algorithm in the controller of unit B will control the operation of unit B to generate an AC current source, based on equation (12), or (23.1) as shown above. The control algorithm in the controller of unit C will control the operation of unit C to generate an AC current source, based on equation (13.1), or (23.2) as shown above. The control algorithm in the controller of unit D will control the operation of unit D to generate an AC current source, based on equation (13.2), or (23.3) as shown above.

Figure 24:
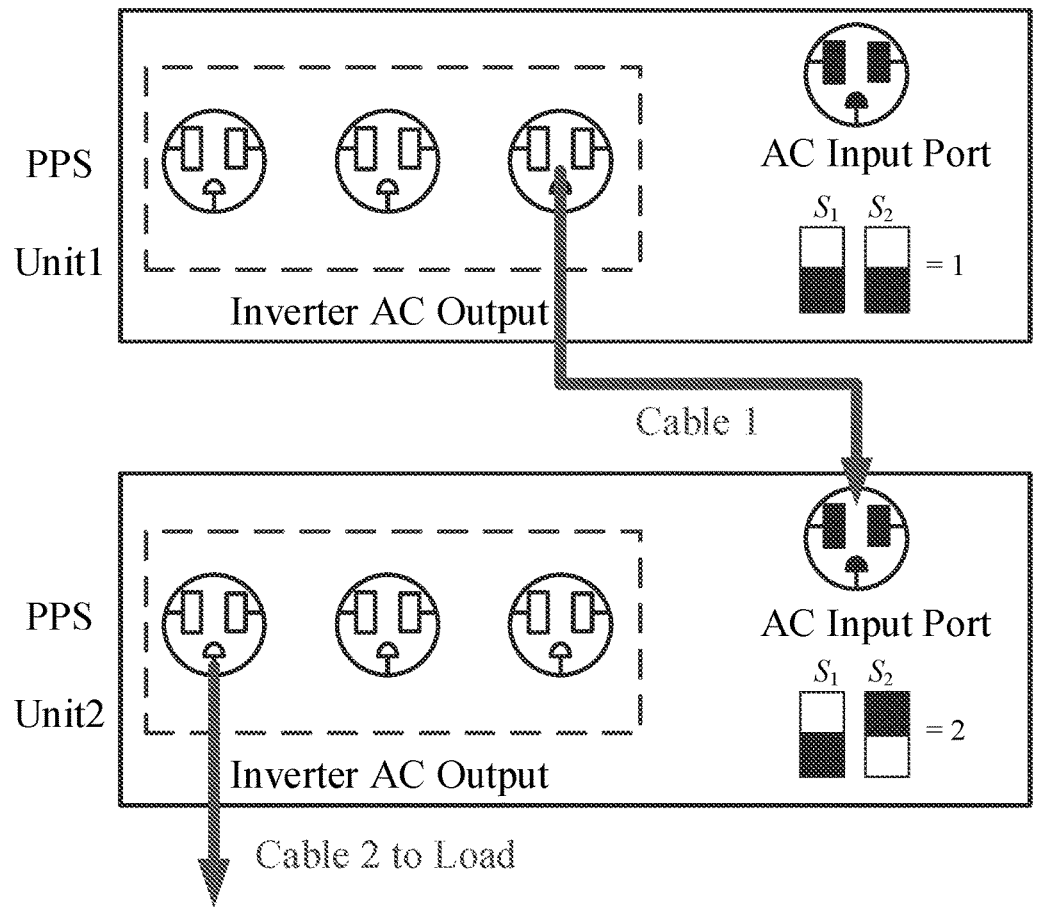
FIG. 24 is a diagram showing panels of two PPS units connected in parallel, with panel-mounted switches for designating the PPS units as unit 1 or unit 2, according to one embodiment.

It is noted that since the hardware of PPS unit A, PPS unit B, PPS unit C, and PPS unit D may be identical to each other, any one of these units can be assigned as unit 1, unit 2, unit 3, and unit 4. For example, PPS unit C can be assigned as unit 1, which will generate an AC voltage source. PPS unit A can be assigned as unit 2. PPS unit B can be assigned as unit 3. PPS unit D can be assigned as unit 4. The assignment can be done by switches as shown in FIG. 24 and FIG. 25. The assignment can also be done by an APP running on a smart phone, tablet, etc., as shown in FIG. 26. After the PPS units are assigned, the connection of these PPS units may be based on FIG. 8, in the case of four PPS units connected in parallel.

Similarly for other numbers of PPS units connected in parallel, the assignment of each PPS unit can be done in the same way, either by a switch or by an APP. Of course, other communication methods may also be used.

All cited publications are incorporated herein by reference in their entirety.

EQUIVALENTS

It will be appreciated that modifications may be made to the embodiments described herein without departing from the scope of the invention. Accordingly, the invention should not be limited by the specific embodiments set forth but should be given the broadest interpretation consistent with the teachings of the description as a whole.

The invention claimed is:

1. A portable power station (PPS) unit, comprising:
   an AC input port adapted to receive AC power;
   a connection point for an energy storage device that stores electrical energy as DC power;
   an AC output port adapted to output AC power;
   an inverter that converts DC power from the energy storage device to AC power that is output by the AC output port;
   a controller that receives AC current information of AC power that is received at the AC input port and produces a control signal for the inverter;
   wherein the controller controls the PPS unit to operate as a voltage source or a current source based on the control signal.

2. The PPS unit of claim 1, wherein the energy storage device comprises at least one battery.

3. The PPS unit of claim 1, wherein the energy storage device comprises at least one battery that is housed in the PPS unit.

4. The PPS unit of claim 1, wherein the inverter comprises a bi-directional inverter;
   wherein the bi-directional inverter operates in a rectifier mode that converts AC power received at the AC input port to DC power to charge the energy storage device, and in an inverter mode that converts DC power from the energy storage device to AC power that is output by the AC output port.

5. The PPS unit of claim 1, wherein the controller receives AC current information of a first AC input power that is received at the AC input port and produces a control signal from the AC current information;
   wherein the control signal controls the inverter to operate as a current source and to produce an AC output power having a current at substantially the same frequency and phase as the first AC input power;
   wherein a total AC output power of the PPS unit is substantially a sum of the AC input power received at the AC input port and the AC output power produced by the PPS unit.

6. The PPS unit of claim 5, wherein the first AC input power is produced by a first PPS unit operating as a voltage source.

7. A PPS apparatus comprising:
   two or more PPS units connected together one after another such that the AC output power of one PPS unit is connected to the AC input port of a next PPS unit;
   wherein a first PPS unit comprises a voltage source;
   wherein a second or more PPS units according to claim 1 operate as a current source;
   wherein a total AC output power of the PPS apparatus is substantially a sum of the AC output power produced by the two or more PPS units.

8. The PPS apparatus of claim 7, wherein the first PPS unit comprises a PPS unit according to claim 1 operating as a voltage source.

9. The PPS apparatus of claim 7, wherein for each PPS unit j, wherein j=2, 3, 4, . . . , N, an AC output current is approximately equal to the AC output current of the previous PPS unit*1/(j−1).

10. The PPS apparatus of claim 7, wherein the controller of the second or more PPS unit implements delayed current control;
    wherein an output current of the second or more PPS unit at one line period is controlled to be the same as the output current of a previous PPS unit at a previous line period.

11. The PPS apparatus of claim 7, wherein the controller of the second or more PPS unit implements instantaneous current control;
    wherein an instantaneous value of an output current of the second or more PPS unit is controlled to be the same as an instantaneous value of an output current of a previous PPS unit.

12. The PPS unit of claim 1, wherein the controller implements at least one of a PPS unit startup strategy and a PPS unit shut down strategy.

13. The PPS unit of claim 1, wherein the controller implements a PPS unit soft startup strategy.

14. The PPS unit of claim 1, wherein the controller is configured for wireless communications with a remote device.

15. A method for implementing a portable power station (PPS) unit, comprising:
    providing an AC input port adapted to receive AC power, a connection point for an energy storage device that stores electrical energy as DC power, an AC output port adapted to output AC power; and an inverter that converts DC power from the energy storage device to AC power that is output by the AC output port;
    using a controller to receive AC current information of AC power that is received at the AC input port and produce a control signal for the inverter;
    using the controller to control the PPS unit to operate as a voltage source or a current source based on the control signal.

16. The method of claim 15, wherein the controller receives AC current information of a first AC input power that is received at the AC input port and produces the control signal from the AC current information;
    wherein the control signal controls the inverter to operate as a current source and to produce an AC output power having a current at substantially the same frequency and phase as the first AC input power;
    wherein a total AC output power of the PPS unit is substantially a sum of the AC input power received at the AC input port and the AC output power produced by the PPS unit.

17. The method of claim 15, wherein the first AC input power is produced by a first PPS unit operating as a voltage source.

18. A method for implementing a PPS apparatus comprising:
    connecting two or more PPS units together one after another such that the AC output power of one PPS unit is connected to the AC input port of a next PPS unit;
    wherein a first PPS unit comprises a voltage source;
    wherein second or more PPS units according to claim 1 operate as a current source;
    wherein a total AC output power of the PPS apparatus is substantially a sum of the AC output power produced by the two or more PPS units.

19. The method of claim 18, wherein for each PPS unit j, wherein j=2, 3, 4, . . . , N, an AC output current is approximately equal to the AC output current of the previous PPS unit*1/(j−1).

20. The method of claim 18, comprising controlling the second or more PPS unit using delayed current control;
    wherein an output current of the second or more PPS unit at one line period is controlled to be the same as the output current of a previous PPS unit at a previous line current period.

21. The method of claim 18, wherein the controller of the second or more PPS unit implements instantaneous current control;
    wherein an instantaneous value of an output current of the second or more PPS unit is controlled to be the same as an instantaneous value of an output current of a previous PPS unit.

22. The method of claim 18, wherein each of the two or more PPS units communicates with an APP running on a remote device;
    wherein one or more parameters of each of the two or more PPS units is controlled by the APP.

23. Non-transitory computer readable media for use with a processor, the computer readable media having stored thereon instructions that direct the processor to execute processing steps comprising controlling one or more parameters of each of two or more portable power station (PPS) units connected together;
    wherein the two or more PPS units are connected together one after another such that the AC output power of one PPS unit is connected to the AC input port of a next PPS unit;
    wherein a first PPS unit operates a voltage source;
    wherein a second or more PPS unit operates as a current source;
    wherein a total AC output power of the two or more PPS units is substantially a sum of the AC output power produced by the two or more PPS units.

\* \* \* \* \*